United States Patent
Gross et al.

(10) Patent No.: US 10,829,386 B1
(45) Date of Patent: Nov. 10, 2020

(54) METHODS FOR MAKING HYDROTHERMALLY CRYSTALLIZED WATER-DISPERSIBLE HEXAFERRITE PLATELETS

(71) Applicant: HRL Laboratories, LLC, Malibu, CA (US)

(72) Inventors: Adam F. Gross, Santa Monica, CA (US); Xin N. Guan, Monterey Park, CA (US); Shanying Cui, Calabasas, CA (US); Florian G. Herrault, Agoura Hills, CA (US)

(73) Assignee: HRL Laboratories, LLC, Malibu, CA (US)

( * ) Notice: Subject to any disclaimer, the term of this patent is extended or adjusted under 35 U.S.C. 154(b) by 162 days.

(21) Appl. No.: 16/203,788

(22) Filed: Nov. 29, 2018

Related U.S. Application Data

(60) Provisional application No. 62/639,248, filed on Mar. 6, 2018.

(51) Int. Cl.
*C01G 49/00* (2006.01)
*B82Y 40/00* (2011.01)

(52) U.S. Cl.
CPC ......... *C01G 49/0036* (2013.01); *B82Y 40/00* (2013.01); *C01P 2002/72* (2013.01); *C01P 2004/03* (2013.01); *C01P 2004/24* (2013.01); *C01P 2004/64* (2013.01); *C01P 2006/22* (2013.01); *C01P 2006/40* (2013.01); *C01P 2006/42* (2013.01)

(58) Field of Classification Search
CPC ............ C01G 49/0036; C01P 2002/72; C01P 2004/03; C01P 2004/24; C01P 2004/64; C01P 2006/22; C01P 2006/40; C01P 2006/42; B82Y 40/00
See application file for complete search history.

(56) References Cited

PUBLICATIONS

Rangappa et al., Preparation of Ba-Hexaferrite Nanocrystals by an Organic Ligand-Assisted Supercritical Water Process, 2010, Crystal Growth & Design, 10, 11-15 (Year: 2010).*

* cited by examiner

*Primary Examiner* — James A Fiorito
(74) *Attorney, Agent, or Firm* — O'Connor & Company

(57) ABSTRACT

Some variations provide a method of making water-dispersed hexaferrite nanoparticles, comprising: providing a first salt containing iron, a second salt containing barium and/or strontium, and a third salt containing an anion or cation that is capable of forming a ligand with the hexaferrite nanoparticles; combining the first salt, second salt, third salt, and water to form a reaction mixture; subjecting the reaction mixture to effective reaction conditions to produce hexaferrite nanoparticles with the anion or cation in the third salt forming a ligand on the surface, so that the hexaferrite nanoparticles are dissolved and/or suspended in the reaction mixture; and obtaining water-dispersed hexaferrite nanoparticles with an average zeta potential of at least ±20 mV. The water-dispersed hexaferrite nanoparticles have a hexaferrite content of at least 85 wt %. The method may further include assembling water-dispersed hexaferrite nanoparticles into a magnetic component, such as a self-biased hexaferrite film on a semiconductor substrate.

24 Claims, 11 Drawing Sheets

METHODS FOR MAKING HYDROTHERMALLY CRYSTALLIZED WATER-DISPERSIBLE HEXAFERRITE PLATELETS

PRIORITY DATA

This patent application is a non-provisional application claiming priority to U.S. Provisional Patent App. No. 62/639,248, filed Mar. 6, 2018, which is hereby incorporated by reference herein.

STATEMENT REGARDING FEDERALLY SPONSORED RESEARCH OR DEVELOPMENT

This invention was made with Government support under U.S. Department of Defense Contract No. W911NF-17-C-0023. The Government has certain rights in this invention.

FIELD OF THE INVENTION

The present invention generally relates to hexaferrite nanoparticles produced from hydrothermal treatment, and self-biased hexaferrite films or other objects assembled from the hexaferrite nanoparticles.

BACKGROUND OF THE INVENTION

There are a group of ferrites with a hexagonal crystal structure, known as hexaferrites (hexagonal ferrites). Hexaferrites are important materials commercially and technologically. Hexagonal ferrites are the most common magnetic materials used today, with the M-type (this is a subset of hexaferrites including $BaFe_{12}O_{19}$ and $SrFe_{12}O_{19}$) barium hexaferrite alone accounting for 50% of the total magnetic materials manufactured globally, at over 300,000 ton/year.

The hexagonal ferrites are all ferrimagnetic materials, and their magnetic properties are intrinsically linked to their crystalline structures. In addition to their general magnetic properties and uses as magnetic materials, there has been an explosion of interest in hexaferrites in the last decade for more exotic applications—such as electronic components and electromagnetic absorbers, composite materials, nanocomposites, magnetoelectric/multiferroic applications, and orientation in ferrite fibers.

Self-biased hexaferrite materials are enabling for magnetic microwave components, such as circulators. However, self-biased hexaferrite materials are currently made from sintered powder and packaged with conductors as discrete surface-mount components. Integration with circuits is done at the board level with die attach (e.g., silver epoxy, solder) and wire bonds or printed circuit board wiring. This configuration results in poor use of space on devices and order-of-magnitude larger electronic subsystems than is possible if self-biased hexaferrites could be selectively deposited as thick areas on semiconductor wafers as part of an integrated circuit fabrication process flow.

To deposit hexaferrite nanoparticles directly as thick areas on substrates (rather than the hexaferrite nanoparticles being die-attached), the hexaferrite nanoparticles should begin suspended in an aqueous solution. This is not possible with known synthesis approaches.

For example, Pullar, "Hexagonal ferrites: A review of the synthesis, properties and applications of hexaferrite ceramics," *Progress in Materials Science* 57 (2012) 1191-1334, which is hereby incorporated by reference herein, describes methods such as precipitation, combustion, and sol-gel synthesis of ferrites. All these methods require furnace treatments to crystallize the nanoparticles. Pullar also explains that the formation of hexagonal ferrites is a complicated series of chemical reactions. It is widely believed that high temperatures (>700° C.) are necessary to produce hexagonal ferrites.

Wu et al., "Synthesis and assembly of barium-doped iron oxide nanoparticles and nanomagnets," *Nanoscale* 7 (2015) 16165-16169 shows the synthesis of round particles with the composition but not crystal structure of hexaferrites, which lose shape upon high-temperature furnace treatment-induced crystallization and form a film instead of discrete nanoparticles.

Cao et al., "One-step synthesis of single phase micro-sized $BaFe_{12}O_{19}$ hexaplates via a modified hydrothermal approach," *Materials Chemistry and Physics* 184 (2016) 241-249 describes forming crystallized barium hexaferrite nanoparticles hydrothermally. Poly(ethylene glycol) is added to affect shape, but the nanoparticles are not describes as being dispersible in water.

Primic et al., "Hydrothermal synthesis of ultrafine barium hexaferrite nanoparticles and the preparation of their stable suspensions," *Nanotechnology* 20 (2009) 315605, discusses hydrothermally synthesizing crystallized barium hexaferrite nanoparticles in water as well as adding oleic acid to the synthesis to control shape and allow the nanoparticle to be dispersed in a non-polar solvent. No method of forming water-dispersible nanoparticles is disclosed.

Primic et al., "Composite nanoplatelets combining soft-magnetic iron oxide with hard-magnetic barium hexaferrite," *Nanoscale* 2015, 7, 2688 describes forming hydrothermally synthesized crystalline barium hexaferrite with oleic acid, treating the nanoparticles with citric acid following nanoparticle synthesis to replace the oleic acid and enable dispersion in water.

Ovtar et al., "Barium hexaferrite suspensions for electrophoretic deposition," *Journal of Colloid and Interface Science* Volume 337, Issue 2, 2009, 456-463 describes preparation of barium hexaferrite suspensions, with the stability of the magnetic barium hexaferrite particles being increased by the addition of a surfactant, dodecylbenzylsulfonic acid. The addition of dodecylbenzylsulfonic acid results in solubility in 1-butanol, but not suspension in water.

Most approaches to forming ferrites (e.g., sol-gel, citrate ligand-assisted synthesis, or mix and bake) create a precursor solid with a wide size distribution, followed by a thermal treatment in a furnace to form the ferrite crystal structure. There is significant atomic movement as the precursor elements combine into one crystal structure. The nanoparticle shape grows in size and the particles become more polydisperse with additional heating and atomic movement. Additionally, the conventional furnace treatment results in loss of surface chemical groups (such as hydroxides or dangling bonds) which leads to the loss of nanoparticle dispersion.

There remains a desire for methods to make water-dispersible, crystalline hexaferrite nanoparticles without requiring post-synthesis modification.

SUMMARY OF THE INVENTION

The present invention addresses the aforementioned needs in the art, as will now be summarized and then further described in detail below.

In some variations, the invention provides a method of making water-dispersed hexaferrite nanoparticles, the method comprising:

(a) providing a first salt containing iron and a second salt containing barium and/or strontium, wherein at least one of the first salt or the second salt further contains oxygen;

(b) providing a third salt containing an anion or cation that is capable of forming a ligand with hexaferrite nanoparticles that are formed in step (d);

(c) combining the first salt, the second salt, the third salt, and water to form a reaction mixture;

(d) heating the reaction mixture to a reaction temperature selected from about 100° C. to about 400° C. for a reaction time selected from about 1 minute to about 10 hours, wherein hexaferrite nanoparticles are formed and are dissolved and/or suspended in the reaction mixture, and wherein the anion or the cation in the third salt forms a ligand on the surface of the hexaferrite nanoparticles; and (e) obtaining water-dispersed hexaferrite nanoparticles with an average zeta potential of at least ±20 mV (i.e. ≥20 mV or ≤−20 mV), wherein the water-dispersed hexaferrite nanoparticles are characterized by an average hexaferrite content of at least 85 wt %.

The reaction mixture is typically contained in a sealed reaction vessel, which may at atmospheric pressure or under pressure or vacuum. In some embodiments, the reaction temperature is selected from about 200° C. to about 300° C.

In some embodiments, the method further comprises cooling the reaction mixture following step (d). In these or other embodiments, the method may further comprise washing the hexaferrite nanoparticles in an aqueous solution following step (d). Whether or not the reaction mixture is cooled and/or washed, water may be added to the hexaferrite nanoparticles, such as between step (d) and step (e).

In certain embodiments, in step (e), the water-dispersed hexaferrite nanoparticles have an average zeta potential of at least ±30 mV.

In certain embodiments, the water-dispersed hexaferrite nanoparticles are characterized by an average hexaferrite content of at least 95 wt %. The hexaferrite nanoparticles may contain $BaFe_{12}O_{19}$, $SrFe_{12}O_{19}$, or a mixture thereof. In some embodiments, the hexaferrite nanoparticles are characterized by an average percent of crystalline hexaferrite of at least 80%, or at least 90%.

The ligand may be selected from the group consisting of thiocyanate, ethylenediaminetetraacetate, citrate, and combinations thereof, for example.

The ligand (including components thereof) is preferably not incorporated into the crystal structure of the hexaferrite nanoparticles, but rather is only adhered to the surface of the hexaferrite nanoparticles.

In some embodiments, the method further comprises exchanging the ligand with a second ligand, thereby modifying the hexaferrite nanoparticles so that they are dispersible in a solvent other than water.

In these or other embodiments, the method further comprises treating the hexaferrite nanoparticles with an alkoxysilane.

The hexaferrite nanoparticles may be characterized by an average particle thickness from about 1 nanometer to about 500 nanometers. In these or other embodiments, the hexaferrite nanoparticles may be characterized by an average particle width from about 10 nanometers to about 1000 nanometers.

The hexaferrite nanoparticles may be characterized by a polydispersity of less than 30% standard deviation of average nanoparticle width. In these or other embodiments, the hexaferrite nanoparticles may be characterized by a polydispersity of less than 30% standard deviation of average nanoparticle thickness.

In some preferred embodiments, the hexaferrite nanoparticles are characterized by a magnetic remanence to saturation ratio greater than 0.6. The method may include drying and aligning the hexaferrite nanoparticles to generate dried and aligned hexaferrite nanoparticles, wherein the dried and aligned hexaferrite nanoparticles are characterized by a magnetic remanence to saturation ratio greater than 0.6.

The method may further include assembling a plurality of the water-dispersed hexaferrite nanoparticles into a magnetic component. The magnetic component may be a self-biased hexaferrite film. Optionally, the magnetic component is disposed on a substrate, such as (but not limited to) a semiconductor.

In certain embodiments, a method of making water-dispersed hexaferrite nanoparticles comprises:

(a) providing a first salt containing iron nitrate and a second salt containing barium nitrate and/or strontium nitrate;

(b) providing a third salt containing ammonium thiocyanate and/or citric acid;

(c) combining the first salt, the second salt, the third salt, and water to form a reaction mixture;

(d) heating the reaction mixture to a reaction temperature selected from about 100° C. to about 350° C. for a reaction time selected from about 1 minute to about 6 hours, wherein hexaferrite nanoparticles are formed and are dissolved and/or suspended in the reaction mixture, and wherein the third salt forms a thiocyanate and/or citrate ligand on the surface of the hexaferrite nanoparticles; and (e) obtaining water-dispersed hexaferrite nanoparticles with an average zeta potential of at least ±20 mV, wherein the water-dispersed hexaferrite nanoparticles are characterized by an average hexaferrite content of at least 95 wt %.

Some variations of the invention provide a composition containing hexaferrite nanoparticles produced by a method as disclosed.

DETAILED DESCRIPTION OF EMBODIMENTS OF THE INVENTION

Figure 1:
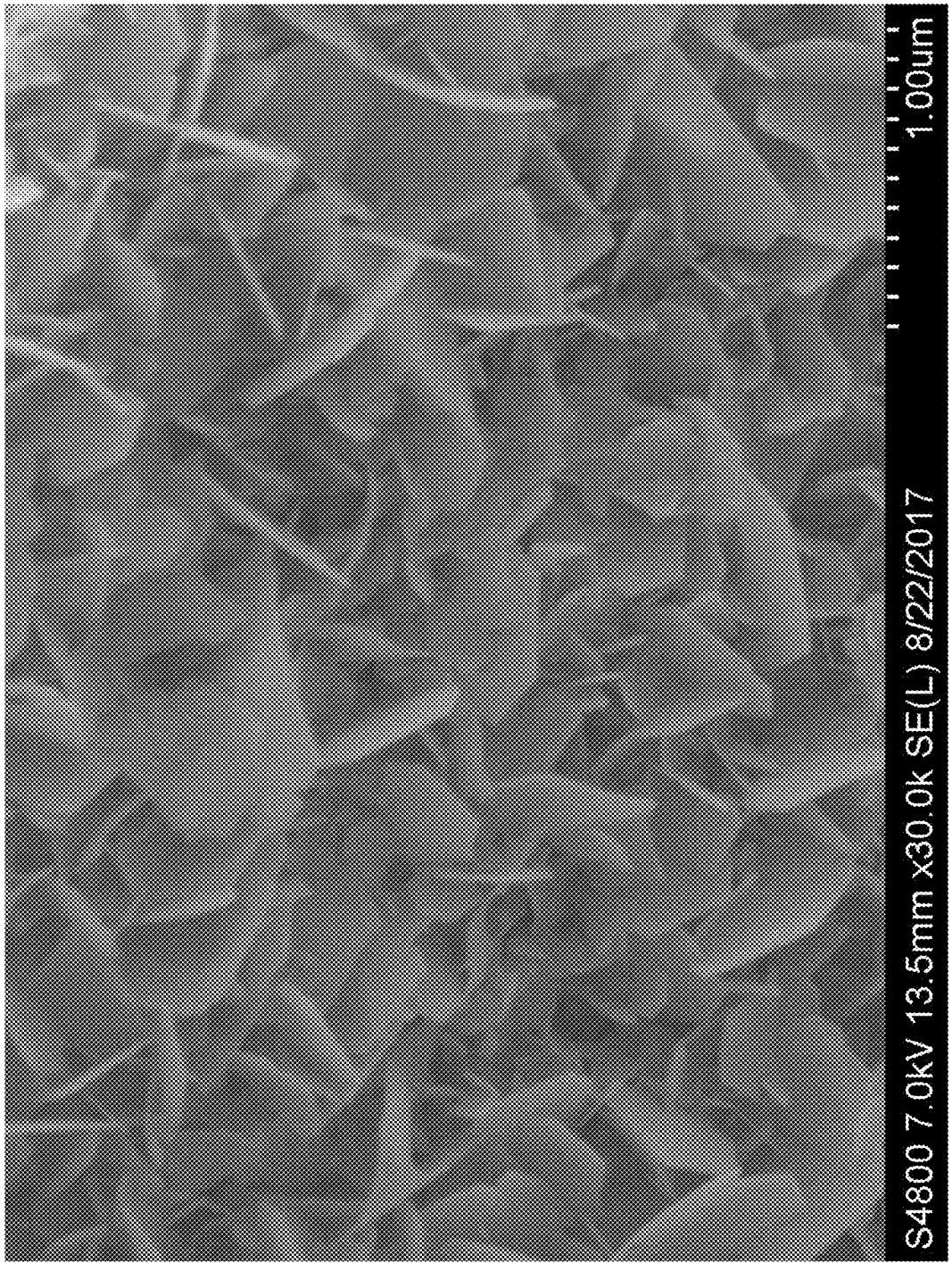
FIG. 1 is a SEM image of $BaFe_{12}O_{19}$ hexaferrite nanoparticles (platelets) synthesized at 270° C. for 10 min, according to Example 1.

The methods, systems, and compositions of the present invention will be described in detail by reference to various non-limiting embodiments.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with the accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms, except when used in Markush groups. Thus in some embodiments not otherwise explicitly recited, any instance of "comprising" may be replaced by "consisting of" or, alternatively, by "consisting essentially of."

This disclosure provides methods to produce faceted, pure-phase hexaferrite (e.g., $MFe_{12}O_{19}$ wherein $M=Ba^{2+}$ and/or $Sr^{2+}$) nanoparticles with high crystallinity. The methods are based on hydrothermal treatment at relatively low temperatures (about 100-400° C.) instead of furnace treatments at high temperatures (above 700° C.). The hydrothermal treatment maintains the dispersability of particles in aqueous solution—a property that is lost in a traditional furnace treatment. In particular, molecular precursors are dissolved in water with salts to provide nanoparticle dispersion. The material is heated in a reaction vessel and barium or strontium hexaferrite crystals are formed, with no required furnace treatment. Additionally, if a dispersion-enabling salt is included, the salt enables the formation of a ligand on the nanoparticle surface and the nanoparticle suspends in water without additional treatment. After synthesis, the nanoparticles may be aqueously assembled into thick layers on substrates, to form self-biased hexaferrite films, for example.

Integrated microwave and mm-wave magnetic components are of particular interest for military applications in which ultra-compact, highly-integrated mm-wave subsystems are needed (e.g., radars, transmitters, receivers, etc.). The present disclosure can also be applied to a variety of magnetic nanoparticles, which would lead to many commercial and military applications (e.g., magnetic sensors, actuators, transformers, inductors, etc.). The nanoparticles provided herein may be part of magnetic devices. Magnetic devices are key components of many microelectronic chips and systems.

In some variations, the invention provides a method of making water-dispersed hexaferrite nanoparticles, the method comprising:

(a) providing a first salt containing iron and a second salt containing barium and/or strontium, wherein at least one of the first salt or the second salt further contains oxygen (i.e., at least one oxygen atom is contained in the salt molecule, such as the six O atoms in barium nitrate, $Ba(NO_3)_2$);

(b) providing a third salt containing an anion or cation that is capable of forming a ligand with the hexaferrite nanoparticles;

(c) combining the first salt, the second salt, the third salt, and water to form a reaction mixture;

(d) heating the reaction mixture to a reaction temperature selected from about 100° C. to about 400° C. for a reaction time selected from about 1 minute to about 10 hours, wherein hexaferrite nanoparticles are formed and are dissolved and/or suspended in the reaction mixture, and wherein the anion or the cation in the third salt forms a ligand on the surface of the hexaferrite nanoparticles; and (e) obtaining water-dispersed hexaferrite nanoparticles with an average zeta potential of at least ±20 mV, wherein the water-dispersed hexaferrite nanoparticles are characterized by an average hexaferrite content of at least 85 wt % (that is, 85% of the solid in the nanoparticles is hexaferrite and the other 15% is one or more other materials that are not hexaferrite).

"Hexaferrite" or hexagonal ferrite is a ceramic compound containing iron oxide combined chemically with one or more additional metallic elements in a hexagonal crystal structure. A hexagonal crystal structure is well-known in the art, with a hexagonal lattice system having one six-fold axis of rotation. Examples of hexaferrites are barium ferrite ($BaFe_{12}O_{19}$) and strontium ferrite ($SrFe_{12}O_{19}$). "Nanoparticles" are particles with at least one dimension from about 1 nanometer to about 1000 nanometers.

A "salt" is an ionic compound that can be formed by the neutralization reaction of an acid and a base, and/or by the combination of a cation with an anion so that the salt is typically electrically neutral. A salt may also contain water of hydration. An exemplary salt that contains iron is iron nitrate nonahydrate (Fe(NO$_3$)$_3$·9H$_2$O). An exemplary salt that contains barium is barium nitrate (Ba(NO$_3$)$_2$). An exemplary salt that contains an anion capable of forming a ligand with the hexaferrite nanoparticles is ammonium thiocyanate (NH$_4$SCN), which forms a thiocyanate (anion) ligand.

The reaction mixture may be at a wide range of pH values initially and during reaction, depending on the type and concentration of salts present, the type and concentration of formed hexaferrite nanoparticles, and the presence of acids or bases. In some embodiments, the reaction mixture is at an acidic pH from about 2 to about 6. In other embodiments, the reaction mixture is at an alkaline pH from about 8 to about 12. In certain embodiments, the reaction mixture is at a neutral pH from about 6 to about 8.

Prior to step (d), the reaction mixture may be in a container or multiple containers. The first, second, and third salts may all be added directly to the reaction vessel, simultaneously or sequentially. Additional water may be added, if needed, to the reaction vessel.

The reaction mixture during step (d) is typically contained in a sealed reaction vessel, which may at atmospheric pressure or under pressure or vacuum. In various embodiments, the reaction mixture during reaction is under a pressure selected from about 0.1 atm to about 10 atm, such as about 0.5 atm to about 5 atm, or about 1 atm.

In some embodiments, the reaction temperature is selected from about 100° C. to about 350° C., such as from about 200° C. to about 300° C. In various embodiments, the reaction temperature is about 125° C., 150° C., 175° C., 200° C., 225° C., 250° C., 275° C., 300° C., 325° C., 350° C., or 375° C.

The reaction mixture may be reacted in a variety of types of reaction vessels, such as, but not limited to, batch reactors, semi-batch reactors, continuous stirred-tank reactors, and continuous tubular reactors. The reactor may be agitated or non-agitated.

Without being limited by theory, it is believed that dissolved ions derived from the first and second salts react with each other under effective reaction conditions described above, leading to the formation of solid hexaferrite nanoparticles. The third salt contributes an anion or cation, simultaneously with the formation of the hexaferrite nanoparticles or sequentially to that (but during the synthesis), as a ligand on the surface of the hexaferrite nanoparticles. The ligand enhances the dispersion of the hexaferrite nanoparticles to avoid significant precipitation of those nanoparticles out of solution. As shown in Example 4, adding a ligand during the synthesis is not equivalent to treatment of the nanoparticles with a salt-derived ligand following synthesis.

In some embodiments, the method further comprises cooling the reaction mixture following step (d). Cooling may be accomplished in various ways, such as by quenching the reaction vessel in water or another liquid, injection of a cool liquid (such as water) into the reaction mixture, inert gas circulation through the reaction vessel, or external cooling of the reaction vessel (or a portion thereof) using a heat-transfer coolant.

In these or other embodiments, the method may further comprise washing the hexaferrite nanoparticles in an aqueous solution following step (d). Washing may be accomplished within the reaction vessel itself by introducing an aqueous solution directly, following the reaction, or by recovering the reaction vessel contents and separately washing them in another unit (e.g., a wash column).

Whether or not the reaction mixture is cooled and/or washed, water may be added to the hexaferrite nanoparticles, such as during step (d), between step (d) and step (e), during step (e), and/or following step (e). In certain embodiments, at least a portion of water is removed from the composition containing the hexaferrite nanoparticles, for storage or shipping, for example. At a later time, water may be added back to the hexaferrite nanoparticles, for purposes of aqueous assemble of hexaferrite nanoparticles into magnetic films, for example.

The water-dispersed hexaferrite nanoparticles obtained in step (e) may be recovered directly into a product container, or they may be further treated or used. Additives (such as buffers or pH modifiers) may be introduced, if desired.

Nanoparticles may be dispersed (i.e., dissolved and/or suspended as a colloid) in solution by adjusting the solution pH to increase the zeta potential above +20 mV or below −20 mV. In this disclosure, the notation "±20 mV" (for example) in reference to zeta potential means that the zeta potential is 20 mV in magnitude (absolute value) and may be either 20 mV or −20 mV; this does not refer to a range of values between −20 mV to 20 mV.

The water-dispersed hexaferrite nanoparticles are dissolved and/or suspended in the reaction mixture, which may be referred to as a solution and/or suspension of hexaferrite nanoparticles. Preferably, an average zeta potential of at least ±20 mV is maintained following reaction, to keep the nanoparticles dispersed. During the reaction of step (d) or following step (d), some hexaferrite nanoparticles may precipitate out of solution, meaning that those particles are no longer dissolved or suspended, but rather segregate such as at the bottom of the reaction vessel or product container. For example, some hexaferrite nanoparticles which have zeta potential close to 0 (e.g., due to insufficient concentration of surface ligands) may precipitate out of solution. In preferred embodiments, at least 90%, more preferably at least 95%, and most preferably at least 99% (such as essentially 100%) of the hexaferrite nanoparticles are dispersed in water.

In some embodiments, the hexaferrite nanoparticles have a pH-dependent surface charge, so that the zeta potential changes unidirectionally with a change in solution pH. The pH of a solution or suspension of hexaferrite nanoparticles may be adjusted in order to achieve an average zeta potential of at least ±20 mV. In some embodiments, the solution or suspension of hexaferrite nanoparticles is at a pH, or is adjusted to reach a pH, of about 2, 3, 4, 5, 6, 7, 8, 9, 10, 11, or 12. The solution or suspension of hexaferrite nanoparticles should be at a pH that is far enough from the isoelectric point (where zeta potential=0) of the hexaferrite nanoparticles, to enable dispersion. A plot of zeta potential versus pH is useful to assess optimal pH ranges for the solution or suspension of hexaferrite nanoparticles, in order to maintain an average zeta potential of at least ±20 mV. In certain embodiments, in step (e), the water-dispersed hexaferrite nanoparticles have an average zeta potential of at least ±25 mV or at least ±30 mV.

Preferably, the hexaferrite nanoparticles have a zeta potential such that the hexaferrite nanoparticles stay suspended in water or an aqueous solution at 25° C. for at least 30 seconds, preferably at least 10 minutes, and more preferably at least 1 hour. Most preferably, the nanoparticles stay suspended in water or an aqueous solution at 25° C. indefinitely, until the time of further treatment or use of the hexaferrite nanoparticles, such as in a charge-titrating assembly processed described below.

The hexaferrite nanoparticles are dispersible in water, which does not mean they are not dispersible in other polar protic solvents or in polar aprotic solvents. For example, the hexaferrite nanoparticles may be dispersible in alcohols (e.g., ethanol or n-butanol) or organic acids (e.g., formic acid or acetic acid). The hexaferrite nanoparticles may be dispersible in polar aprotic solvents (e.g., acetone or tetrahydrofuran).

The ligand attached to the hexaferrite nanoparticles may be selected from the group consisting of thiocyanate, dodecyl sulfate, ethylenediaminetetraacetate, citrate, and combinations thereof. These ligands are derived from salts of these anions, such as (but not limited to) ammonium thiocyanate, sodium dodecyl sulfate, ethylenediaminetetraacetic acid (EDTA), and citric acid, respectively. Other charged inorganic ligands or charged organic ligands may be employed, such as (but not limited to) water-soluble carboxylates. Organic ligands contain carbon, hydrogen, and optionally oxygen as well as other elements. Inorganic ligands (e.g., tetrafluoroborate, $BF_4^-$ ligands) do not contain carbon or hydrogen.

The ligand (including components, atoms, or molecules thereof) is preferably not incorporated into the crystal structure of the hexaferrite nanoparticles, but rather is only bonded to the surface of the hexaferrite nanoparticles. The hexaferrite-ligand bond may be a chemical bond, an electrostatic bond, or physical adsorption (van der Waals forces).

In some embodiments, the method further comprises exchanging the ligand with a second ligand, thereby modifying the hexaferrite nanoparticles so that they are dispersible in a solvent other than water (such as one or more of the solvents mentioned above). For example, the hexaferrite nanoparticles may be modified with hydrophobic ligands and/or oleophilic ligands for dispersion in non-polar solvents (e.g., n-pentane or toluene). Ligands or salts on the hexaferrite nanoparticle surface may be exchanged by soaking the nanoparticles in a concentrated solution of the second ligand.

In these or other embodiments, the method further comprises treating the hexaferrite nanoparticles with an alkoxysilane, such as (but not limited to) N1-(3-trimethoxysilylpropyl)diethylenetriamine or 3-(trihydroxysilyl)propyl methylphosphonate, monosodium salt. These alkoxysilanes impart a pH-responsive charge to the hexaferrite nanoparticles.

Preferably, the water-dispersed hexaferrite nanoparticles are characterized by an average hexaferrite content of at least 80 wt %. In less-preferred embodiments, the average hexaferrite content is from about 60 wt % to 80 wt %. In certain preferred embodiments, the water-dispersed hexaferrite nanoparticles are characterized by an average hexaferrite content of at least 90 wt %, at least 95 wt %, at least 99 wt %, or essentially 100 wt % (e.g., see Examples 1 and 2). Note that the calculation of hexaferrite content does not include any ligands attached to the hexaferrite nanoparticles.

The hexaferrite nanoparticles may contain $BaFe_{12}O_{19}$, $SrFe_{12}O_{19}$, or a mixture thereof. A mixture may be a blend of $BaFe_{12}O_{19}$ and $SrFe_{12}O_{19}$, or a chemical composition in which both barium and strontium are present in the crystal structure, $Ba_xSr_{1-x}Fe_{12}O_9$ ($0<x<1$).

When the hexaferrite content of the nanoparticles is less than 100 wt %, the other material may be $Fe_3O_4$, $Fe_2O_3$, or other iron oxides, barium oxides, strontium oxides, or impurities, for example. The material that is not hexaferrite may be crystalline or amorphous. As an example, $Fe_2O_3$ may be present within the hexaferrite nanoparticles, and that $Fe_2O_3$ itself may be crystalline or amorphous.

The crystallinity of the hexaferrite nanoparticles is distinct from the hexaferrite content since it is possible for the nanoparticles to contain amorphous regions of $BaFe_{12}O_{19}$ and/or $SrFe_{12}O_{19}$. As used herein, the "crystallinity" of the nanoparticles, and "crystalline hexaferrite" refer specifically to a hexagonal crystal structure, as measured by X-ray diffraction. Therefore, other crystal structures (such as trigonal crystals of $Fe_2O_3$) are not counted in the definition of crystallinity, or counted toward crystalline hexaferrite content. In various embodiments, the hexaferrite nanoparticles are characterized by an average percent of crystalline hexaferrite of at least 70%, at least 80%, at least 90%, at least 95%, or at least 99%.

The hexaferrite nanoparticles may be characterized by an average particle thickness from about 1 nanometer to about 500 nanometers. For example, the average particle thickness may be about 5, 10, 25, 50, 100, 200, 300, or 400 nanometers. In the case of hexagonal prisms, the thickness is the height of the prism, which is usually less than the prism width.

In these or other embodiments, the hexaferrite nanoparticles may be characterized by an average particle width from about 10 nanometers to about 1000 nanometers. For example, the average particle width may be about 25, 50, 100, 200, 300, 400, 500, 600, 700, 800, or 900 nanometers. In the case of hexagonal prisms, the width is the end-to-end (maximum) length of the top face of the prism, or the effective diameter of the top prism face (the diameter of a circle having the same area as the hexagon prism face).

In some embodiments, the nanoparticles are in the form of platelets, i.e., polygonal prisms. These polygonal prisms may be hexagonal prisms with 8 faces, 18 edges, and 12 vertices. Other polygonal prisms may be present. The polygonal prisms will be hexagonal prisms when they contain single crystals that have hexagonal crystal structure. However, the present invention is by no means limited to single-crystal materials. The presence of crystal defects, grain boundaries, and impurities (including other types of crystals and amorphous regions) means that the nanoparticles themselves may be of various shapes.

Figure 7:
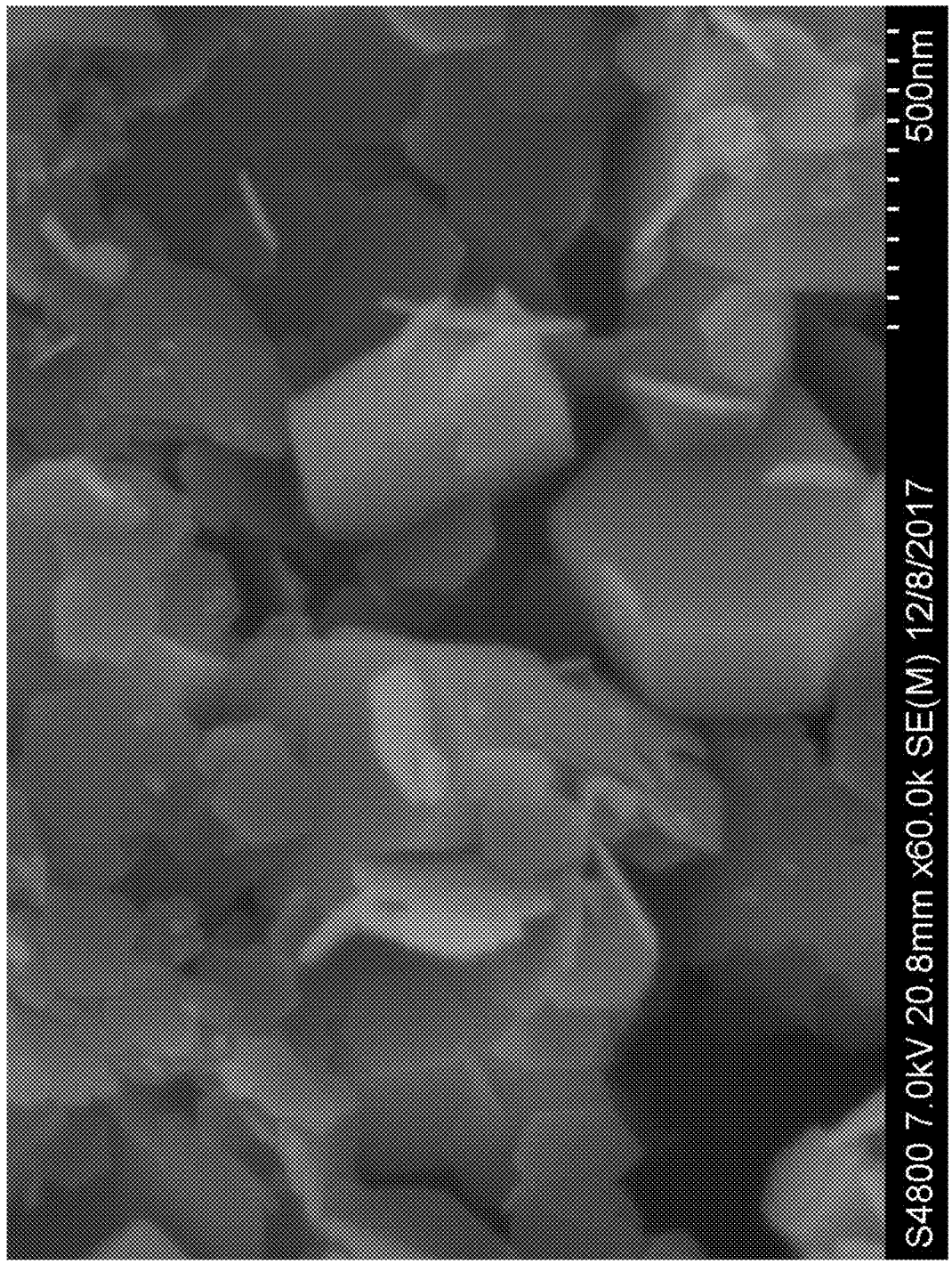
FIG. 7 is a SEM image of $BaFe_{12}O_{19}$ nanoparticles (platelets) synthesized at 300° C. for 90 min, according to Example 3.

The polygonal prisms may have an average thickness of about 1, 5, 10, 25, 50, 100, 250, 500 nanometers, for example. The polygonal prisms may have average polygon side lengths of about 1, 5, 10, 25, 50, 100, 250, 500 nanometers, for example. FIG. 7 shows exemplary polygonal prisms (predominantly hexagonal prisms).

The hexaferrite nanoparticles may be characterized by a polydispersity of less than 30%, preferably less than about 20%, and more preferably less than about 10% standard deviation of average nanoparticle width, calculated as standard deviation of width divided by average width. In these or other embodiments, the hexaferrite nanoparticles may be characterized by a polydispersity of less than about 30%, preferably less than about 20%, and more preferably less than about 10% standard deviation of average nanoparticle thickness, calculated as standard deviation of length divided by average length. The standard deviation provides an indication of size distribution.

Figure 11:
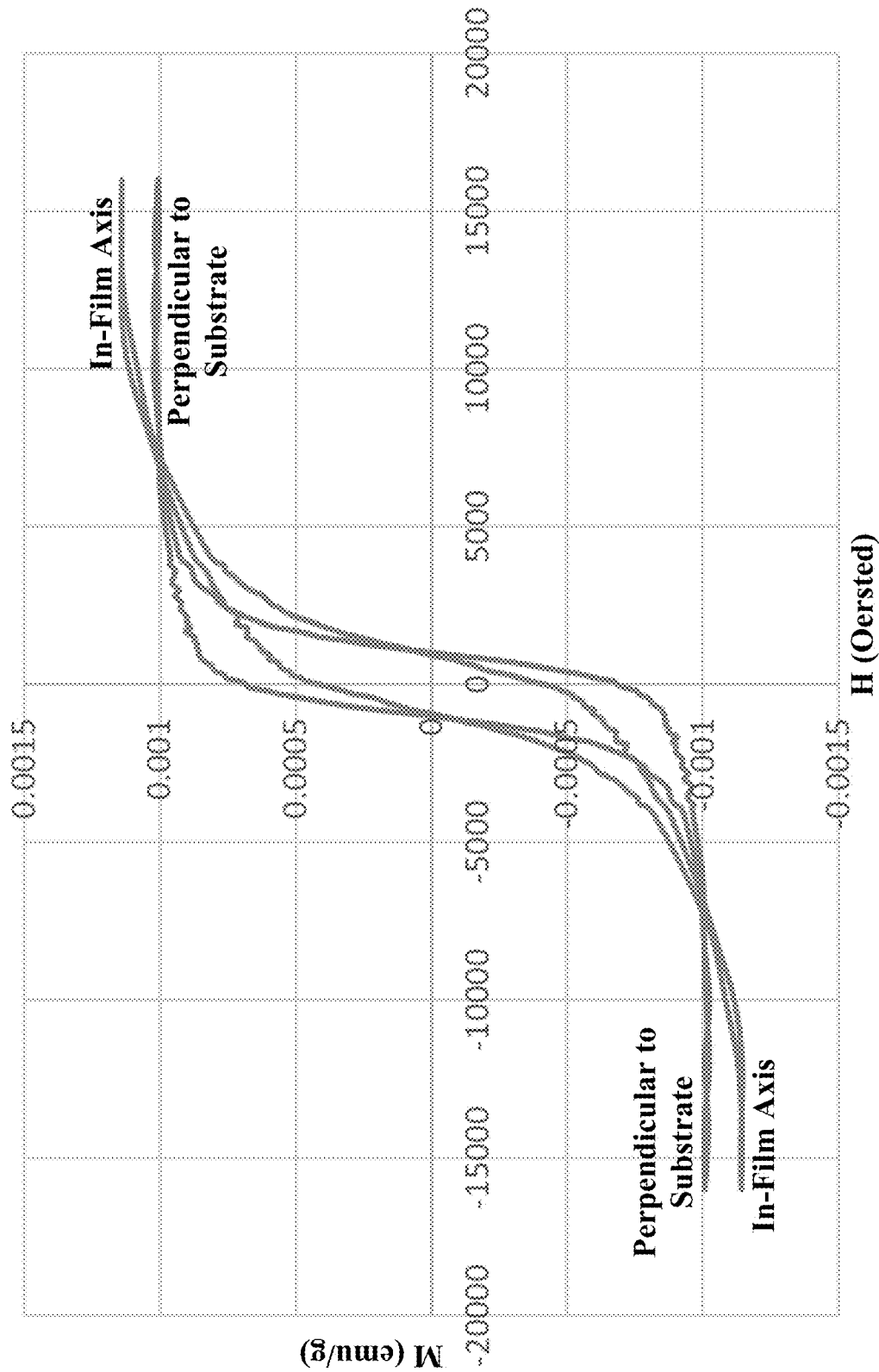
FIG. 11 is a magnetic data plot of dried and aligned $BaFe_{12}O_{19}$ particles in some embodiments, indicating a 0.68 remanence to saturation magnetization ratio.

The hexaferrite nanoparticles may be characterized by a magnetic remanence to saturation ratio ($M_r/M_s$) of at least about 0.5, 0.6, 0.7, 0.8, 0.85, 0.9, or 0.95. As an example, FIG. 11 is a magnetic data plot of dried and aligned $BaFe_{12}O_{19}$ particles. The magnetic response of the aligned particles is measured in a vibrating sample magnetometer. FIG. 11 indicates a 0.68 remanence to saturation magnetization ratio.

In some preferred embodiments, the hexaferrite nanoparticles are characterized by a magnetic remanence to saturation ratio greater than 0.85. This is useful for self-biased hexaferrite nanoparticles. Self-biased hexaferrite means that the material intrinsic remanent magnetization is strong enough to eliminate the need for an external magnetic bias field (typically from a permanent magnet). Self-biasing is generally defined as a material with a remanence to saturation ratio greater than 0.85.

The method may include drying and aligning the hexaferrite nanoparticles to generate dried and aligned hexaferrite nanoparticles, wherein the dried and aligned hexaferrite nanoparticles are characterized by a magnetic remanence to saturation ratio greater than 0.6.

In certain embodiments, a method of making water-dispersed hexaferrite nanoparticles comprises:

(a) providing a first salt containing iron nitrate and a second salt containing barium nitrate and/or strontium nitrate;

(b) providing a third salt containing ammonium thiocyanate and/or citric acid;

(c) combining the first salt, the second salt, the third salt, and water to form a reaction mixture;

(d) heating the reaction mixture to a reaction temperature selected from about 100° C. to about 350° C. for a reaction time selected from about 1 minute to about 6 hours, wherein hexaferrite nanoparticles are formed and are dissolved and/or suspended in the reaction mixture, and wherein the third salt forms a thiocyanate and/or citrate ligand on the surface of the hexaferrite nanoparticles; and (e) obtaining water-dispersed hexaferrite nanoparticles with an average zeta potential of at least ±20 mV, wherein the water-dispersed hexaferrite nanoparticles are characterized by an average hexaferrite content of at least 95 wt %.

The method may further include assembling a plurality of the water-dispersed hexaferrite nanoparticles into a magnetic component. The magnetic component may be a self-biased hexaferrite film. Optionally, the magnetic component is disposed on a substrate. Substrates may be selected from semiconductor materials, metal, silicon, silicon oxide, and so on. Substrates are employed in some preferred embodiments relating to on-chip magnetic components, for example.

Some variations of the invention provide a composition containing $BaFe_{12}O_{19}$ and/or $SrFe_{12}O_{19}$ hexaferrite nanoparticles produced by a method as disclosed. In some embodiments, a composition contains water-dispersed $BaFe_{12}O_{19}$ and/or $SrFe_{12}O_{19}$ hexaferrite nanoparticles with an average zeta potential of at least ±20 mV, wherein the water-dispersed hexaferrite nanoparticles are characterized by an average hexaferrite content of at least 95 wt %, and wherein the hexaferrite nanoparticles are characterized by a magnetic remanence to saturation ratio greater than 0.85.

The water-dispersed $BaFe_{12}O_{19}$ and/or $SrFe_{12}O_{19}$ hexaferrite nanoparticles may be used in a wide variety of ways. In some variations, dissolved hexaferrite platelets are utilized to fabricate magnetic components via charge-titrating assembly, which will now be described in further detail.

Commonly owned U.S. patent application Ser. No. 15/241,536, filed on Aug. 19, 2016, is hereby incorporated by reference herein regarding charge-titrating assembly methods and apparatus that optionally may be applied to hexaferrite nanoparticles as a starting material for that assembly.

Some variations provide a method to assemble hexaferrite nanoparticles into tightly packed structures or arrays. The method preferably employs spatial and temporal control over the zeta potential of the hexaferrite nanoparticles in a parallel manner to achieve alignment and organization. Fully formed nanoparticles are assembled, instead of combining the synthesis of the nanoparticles themselves with the assembly process.

Generally speaking, methods, devices, and systems of the invention may employ charge-titrating particle assembly. By "charge-titrating particle assembly" is meant the assembly of hexaferrite nanoparticles contained in bulk solution, preferably with spatial and/or temporal control over the zeta potential of the particles to achieve alignment and organization of particles. The nanoparticles have an average isoelectric point that may be measured using a zeta potential measurement. The isoelectric point is the pH where the zeta potential is 0.

Charge-titrating particle assembly can create uniform, monodisperse structures or arrays with controlled order and complexity. Tightly packed, monodisperse arrays of hexaferrite nanoparticles are useful for optical, magnetic, and electronic device applications, among other potential uses. Charge-titrating particle assembly, in some embodiments, forms multiple layers (such as 2, 3, 4, 5, 6, 7, 8, 9, 10 or more layers) of packed hexaferrite nanoparticles, with or without a substrate, and optionally with some or all of the ligands removed from the hexaferrite nanoparticles during the assembly.

The ability to add to controlled complexity in the form of spatially non-uniform patterns on the assemblies, enables wider functionality of the assemblies than (i) homogenous assemblies of one type of particle or (ii) core-shell arrangements of assemblies. Controlled complexity, for instance, enables ring resonators and split-ring resonators, which are building blocks of electromagnetic (including optical) meta-materials.

A variety of particle shapes are possible. Particles may be round, cylindrical, elliptical, diamond-shaped, cubic, or hexagonal prism structures, for example. Mixtures of particle shapes may be employed. In some embodiments, the ratio between the shortest and longest dimension is from about 1:1 to about 1:5.

A variety of particle sizes are also possible. In some embodiments, the average particle size (prior to array formation) is from about 1 nanometer to about 100 microns, preferably from about 1 nanometer to about 1 micron. In some preferred embodiments, at least some of the particles are nanoparticles, which may be construed to mean particles having a particle size or at least one dimension below 1 micron. In certain preferred embodiments, all of the particles are nanoparticles, prior to array formation. Much of the remaining disclosure will assume that the particles are nanoparticles, it being understood that the principles of the invention may be applied to microparticles (particles having a particle size of 1 micron or higher) as well.

The nanoparticles may be symmetric or asymmetric. If the nanoparticles are asymmetric, the long axes of individual nanoparticles are preferably aligned (during assembly) in the same direction with respect to one another in the arrays. "Aligned" in this sense means that the long axis of the nanoparticles has a full width at half maximum angular distribution with respect to the array alignment direction of at most about ±20°, more preferably at most about ±10°, and most preferably at most about ±5°.

An "array" or equivalently "assembly" or "packed structure" as intended herein, means a plurality of nanoparticles that are packed together and touching or near touching. In the array, the center-to-center distance between nanoparticles is preferably less than the width of two nanoparticles. More preferably, the center-to-center distance between nanoparticles is less than the width of 1.5 nanoparticles.

The nanoparticles may form multilayer packed structures/arrays in solution. "Multilayer" means at least 2 layers, preferably at least 4 layers, more preferably at least 10 layers, and even more preferably at least 25 layers. Each layer is counted along a continuous layer of nanoparticles. Although nanoparticles preferably assemble into layers within the array, it is also possible to assemble the nanoparticles into a 3-dimensional array without distinct layers in one or more of the dimensions.

The bulk solution contains a solvent which may be selected from water, dimethyl formamide, dimethylsulfoxide, isopropanol or another alcohol, acetone, tetrahydrofuran, or mixtures of these solvents. The solvent preferably contains or consists essentially of water.

A salt such as NaCl, preferably with cations or anions that are not common with the nanoparticle composition, may be added to screen electrostatic charges in solution. Electrostatic repulsion prevents the particles from agglomerating and may be controlled with initial pH. Brownian motion, sonication, gas sparging, and/or bulk mixing (e.g., agitation or vessel rotation) may be used to keep the nanoparticles suspended in solution, during assembly.

In addition to the nanoparticles, one or more triggerable pH-control substances may be added to the solution. The triggerable pH-control substance is preferably selected from thermal acid generators, thermal base generators, photoacid generators, photobase generators, or a combination of the foregoing. A "photoacid generator," or "photoacid," is a molecule which releases an acid, or becomes more acidic upon absorption of light. This may be due either to the release of strong acids upon photolysis, or to formation of a strongly acidic excited state. A "photobase generator," or "photobase," is a molecule which releases a base, or becomes more basic upon absorption of light. This may be due either to the release of strong bases upon photolysis, or to formation of a strongly basic excited state. In this disclosure, a "strong acid" means an acid with a $pK_a$ value less than 4, such as less than 3, 2, 1, 0, −1, or −2. A strong base" means a base with a $pK_b$ value less than 4, such as less than 3, 2, 1, 0, −1, or −2.

The triggerable pH-control substance may be capable of controllably generating a Lewis acid, a Brønsted acid, or an acid that is both a Lewis acid and a Brønsted acid. Similarly, the triggerable pH-control substance may be capable of controllably generating a Lewis base, a Brønsted base, or a base that is both a Lewis base and a Brønsted base.

As an example, (4-fluorophenyl)diphenylsulfonium triflate is a photoacid generator and creates protons ($H^+$ ions) in response to UV light. As another example, sodium tetraphenylborate is a photobase generator and creates hydroxide ions in response to UV light. Another example is 2-(9-oxoxanthen-2-yl)propionic acid 1,5,7-triazabicyclo[4.4.0]dec-5-ene which is a photobase generator that contains multiple functional groups.

Urea is a thermal base generator and creates base (ammonia) from exposure to temperatures above 50° C. Sulfonate salts may be employed as thermal acid generators, creating protons ($H^+$ ions) in response to heat.

Note that some thermal acid/base generators are effective when temperature is reduced, rather than increased. For example, carbon dioxide solubility in solvent can be shifted, with temperature. Changing solubility will shift the carbon dioxide-carbonic acid equilibrium, resulting in a change in pH. In particular, lowering temperature will increase $CO_2$ solubility and result in acidification (via carbonic acid) of an aqueous medium.

The trigger source may be a source of energy that is thermal, optical, mechanical, electromechanical, electrical, acoustic, magnetic, or another effective source to trigger a selected pH-control substance. Combinations of trigger sources may also be employed, such as thermomechanical sources providing both heat as well as mechanical energy. If the trigger is thermal, the trigger source may be a resistive Joule heater. If the trigger is thermal, the trigger source may be a convective heater (or cooler), in which another, hotter or colder fluid passes through a passage. Thermoelectric devices or materials, or infrared heaters, may also be employed for thermal triggers. If the trigger is optical or electromagnetic, the trigger could be for example a light-emitting diode, a laser, an ultraviolet lamp, an incandescent lamp, or a halogen lamp.

Alternatively, or additionally, the triggerable pH-control substance may be triggered by something other than heat or electromagnetic radiation. Possible triggers include sound energy (sonication), or a trigger molecule (such as $CO_2$) which could be bubbled through solution, for example.

The solution is contained or placed in a container that preferably (i) does not lose physical integrity during heating and/or (ii) allows the transmission of light.

The pH of the solution is then titrated towards the isoelectric point, preferably uniformly (in space) within the solution to induce assembly of the hexaferrite nanoparticles. The pH titration is accomplished with the triggerable pH-control substance(s), such as a thermal acid/base generator or a photoacid/base generator, by heating the solution and/or exposing it to light at one or more effective wavelengths, thereby triggering the triggerable pH-control substance(s) so that pH is titrated in a controlled manner.

It is noted that agglomerated nanoparticles may be formed by adjusting the pH of a solution of dispersed nanoparticles with an acid or base solution, to near the isoelectric point of the nanoparticles. However, these nanoparticles will not tend to be tightly packed. Therefore, in preferred embodiments, the solution pH should not be changed by only adding acid or base solutions, because this will result in pH spatial gradients in the solution. Such pH gradients will result in uncontrolled agglomeration instead of assembly of nanoparticles into tightly packed arrays.

In this disclosure, "tightly packed" means a packing density of at least about 50 vol %, preferably at least about 60 vol %, more preferably at least about 70 vol %, even more preferably at least about 80 vol %, yet more preferably at least about 85 vol %, and most preferably at least about 90 vol %. The packing density is 100% minus the void (volume) density, i.e., tighter packing means fewer voids, and conversely, lower-density packing means a greater density of voids (open space). In certain embodiments, the packing density approaches 100 vol % of the theoretical packing density for the shape(s) of particles present.

Uniform pH titration is desired in order to create tightly packed arrays of nanoparticles. Uniform pH titration is enabled by the use of a triggerable pH-control substance. Without wishing to be bound by theory, it is believed that uniform (in solution) pH titration is important because it allows control of particle surface charge. Changes in pH adjust the particle surface charge, which may be measured as surface-charge density.

Furthermore, the use of a triggerable pH-control substance allows the rate of change of pH to be controlled, by controlling the heating (or cooling) input or the amount of UV light input. It has been discovered experimentally that a preferred magnitude (absolute value) of rate of pH change is about 0.01 pH units per minute, or less, at or near the isoelectric point of the particles being assembled. When the pH is rising, the rate of pH change will be positive, and when the pH is falling, the rate of pH change will be negative. Thus "±0.01 pH units per minute, or less" means for example 0.01, 0.009, 0.008 or −0.01, −0.009, −0.008, and so on. In various embodiments, the rate of pH change is about ±0.05, ±0.04, ±0.03, ±0.02, ±0.01, ±0.009, ±0.008, ±0.007, ±0.006, ±0.005, ±0.004, ±0.003, ±0.002, ±0.001 pH units per minute, or less, measured at or near the isoelectric point of the particles being assembled. "Near the isoelectric point" means that the pH is within 2.0, 1.5, 1.0, 0.5, or 0.1 pH units of the isoelectric point. The pH rate of change may also be measured when the zeta potential of the assembling particles is in the range of −20 mV to +20 mV, −10 mV to +10 mV, −5 mV to +5 mV, −2 mV to +2 mV, or about 0 mV.

In some embodiments, heating or light exposure to the solution preferably is stopped when the solution pH is within 2.0, 1.9, 1.8, 1.7, 1.6, 1.5, 1.4, 1.3, 1.2, 1.1, 1.0, 0.9, 0.8, 0.7, 0.6, 0.5, 0.4, 0.3, 0.2, or 0.1 pH units of the isoelectric point of the particles being assembled. In these or other embodiments, heating or light exposure to the solution preferably is stopped when the zeta potential of the assembling particles is in the range of −15 mV to +15 mV, −10 mV to +10 mV, or −5 mV to +5 mV, for example. In some embodiments, heating or light exposure is reduced but not completely stopped at some intermediate solution pH or intermediate zeta potential, and then the heating or light exposure is completely stopped at a second solution pH (that is closer to the isoelectric point of the particles being assembled) or a second zeta potential (that is lower than the intermediate zeta potential). A buffer may optionally be used to slow down the rate of pH change near the isoelectric point or at other points during the titration.

The average zeta potential, prior to triggering the pH-control substance, is at least ±20 mV (i.e., +20 mV or more, or alternatively, −20 mV or less) and its magnitude is reduced during assembly. That is, the zeta potential of the hexaferrite nanoparticles can start high (positive) and be reduced to a lower value, closer to zero. Or, the zeta potential can start highly negative and be increased to a lower magnitude (less negative), closer to zero. Thus for example when the average zeta potential is reduced from ±20 mV to ±10 mV, this ± notation means that either the average zeta potential is reduced from +20 mV to +10 mV, or increased mathematically (but reduced in magnitude) from −20 mV to −10 mV. In some embodiments, the average zeta potential is adjusted to ±10 mV, ±5 mV, ±2 mV, ±1 mV, or less, at the titrated pH compared to the starting pH.

In some embodiments of the invention, the average zeta potential of the first particles in the liquid solution changes at a rate from about ±1 mV/hr to about ±50 mV/hr, i.e. a magnitude (absolute value) from about 1 mV/hr to about 50 mV/hr. In certain embodiments, the average zeta potential changes at a rate from about ±5 mV/hr to about ±30 mV/hr, i.e. a magnitude from about 5 mV/hr to about 30 mV/hr. The values may be positive or negative since the zeta potential may start negative or positive, and approach zero. In particular, when the average zeta potential is decreasing from a positive number toward zero (e.g. from 10 mV to 1 mV), the rate of change will be negative. When the average zeta potential is increasing from a negative number toward zero (e.g. from −10 mV to −1 mV), the rate of change will be positive.

In some embodiments, the hexaferrite nanoparticles are characterized by an average surface-charge density. When the pH-control substance is triggered to generate an acid or a base within the volume of liquid solution, thereby adjusting solution pH from the starting pH to a titrated pH, the average surface-charge density is lower at the titrated pH compared to the starting pH, thereby causing the first particles to assemble into a particle array. The average surface-charge density (at the titrated pH) may be, for example, from about 0 to about 0.05, 0.1, 0.15, 0.2, or 0.25 number of charges per $nm^2$ of hexaferrite nanoparticle surface.

The assembled hexaferrite nanoparticles are then separated from the solution. This separation may be done with centrifugation, filtration, evaporation of the solution, etc. The array of assembled hexaferrite nanoparticles is optionally dried to remove any residual solution. The array may then be utilized as a hexaferrite nanoparticle-containing object.

Many additional variations on the process are possible.

The pH of the solution, and thus the zeta potential of the particles being assembled, may be controlled temporally, spatially, or both temporally and spatially. In some embodiments employing temporal pH control, the intensity of UV light (or another suitable electromagnetic source) decreases over time to change the pH and thus the zeta potential more slowly as the isoelectric point is approached. The decrease could be gradual and continuous, or could be periodic step decreases, for example. In some embodiments employing spatial pH control, UV light (or another suitable electromagnetic source) is masked with a single-tone, two-tone, or gray-scale mask. Holography or interference lithography may also be employed, for example, in some embodiments employing spatial pH control, In some embodiments, the pH of the solution is varied in both time and in space to optimize the packing, such as to increase the size and/or alignment of the arrays. For example, a zone refinement could be implemented in which the solution is illuminated in a plane from a linear or near-linear source and the plane of illumination is translated through the solution volume, as a function of time.

The pH of the solution, and thus the zeta potential of the hexaferrite particles being assembled, may be oscillated in time to refine the packing, such as to increase the size and/or alignment of the arrays. For example, pH oscillation may be triggered by placing both a photoacid and a photobase in the solution, wherein the photoacid and photobase are susceptible to two different wavelengths, and then alternately exposing the solution to the two wavelengths.

In some embodiments, multiple pH-control substances are utilized. The multiple pH-control substances may have different triggers (e.g. one thermal trigger and one electromagnetic radiation trigger) or two of the same type of trigger but with different characteristics (e.g., electromagnetic radiation at two different wavelengths). Selectively triggering one of the multiple pH-control substances, and then another, could be used to oscillate pH of the solution.

The assembly of the hexaferrite nanoparticles, in various embodiments, is characterize by an assembly rate (nanoparticles assembled per second) of about $10^6$, $10^7$, $10^8$, $10^9$, $10^{10}$, $10^{11}$, $10^{12}$ or more. In general, the process of making assembled hexaferrite nanoparticle arrays may be conducted continuously, semi-continuously, or in batch mode.

Some embodiments incorporate an additional step of collecting the assembled particles, resuspending them in a new solution, adding additional particles, and triggering a pH change again.

In some embodiments, the array of hexaferrite nanoparticles includes or is derived from at least 10, 50, 100, 200, 300, 400, or 500 individual particles, and the array of hexaferrite nanoparticles is characterized by a packing density of at least 50%, 60%, 70%, 80%, or 90% on a volume basis.

Some variations provide a structure containing an array of hexaferrite nanoparticles, wherein the array contains at least one hundred individual hexaferrite nanoparticles that are assembled together with a packing density of at least 50 vol %.

The overall thickness of the final, assembled structure or object (containing assembled hexaferrite nanoparticles) may be from about 10 nm to about 1 cm or more, such as about 50 nm, 100 nm, 250 nm, 500 nm, 750 nm, 1 µm, 10 µm, 20 µm, 25 µm, 30 µm, 40 µm, 50 µm, 75 µm, 100 µm, 500 µm, 1 mm, 1 cm, or larger. A repeating, self-similar structure allows the nanoparticle array to be abraded during use while retaining its properties. Should the surface be modified due to environmental events or influences, the self-similar nature of the nanoparticle array allows the freshly exposed surface to present another layer of nanoparticles.

The structure containing assembled hexaferrite nanoparticles may be present in a device, material, or system selected from the group consisting of magnets, optical devices, coatings, electronic devices, electrochemical systems, and computers, for example.

EXAMPLES

Example 1: Hydrothermal Synthesis of Barium Hexaferrite Platelets at 270° C. with Thiocyanate Ligands 26.1 mg barium nitrate ($Ba(NO_3)_2$) and 202 mg iron nitrate nonahydrate ($Fe(NO_3)_3 \cdot 9H_2O$) are dissolved in 1 mL deoxygenated water via a vortex mixer, making a nitrate solution. In a separate container, 1.028 g sodium hydroxide (NaOH) and 18.3 mg ammonium thiocyanate ($NH_4SCN$) are dissolved in 9 mL deoxygenated water with vigorous stirring. The sodium hydroxide solution is purged with nitrogen ($N_2$) continuously while stirring for at least 10 min. The nitrate solution is then added to the sodium hydroxide solution drop by drop while stirring. Finally, the mixture is transferred to a Teflon® (polytetrafluoroethylene) liner and sealed in a Parr vessel (Parr Instrument Company, Moline, Ill., US). The Parr vessel is then placed inside an oven, and the temperature profile is set to 270° C. with a heating rate 3° C./min. The reaction vessel is held at 270° C. for 10 min to produce $BaFe_{12}O_{19}$ nanoparticles. The reaction vessel is then cooled down to room temperature. The final solution is washed with 10 mM nitric acid ($HNO_3$) followed by acetone (($CH_3)_2CO$) several times. The $BaFe_{12}O_{19}$ nanoparticles are resuspended in DI water.

Figure 2:
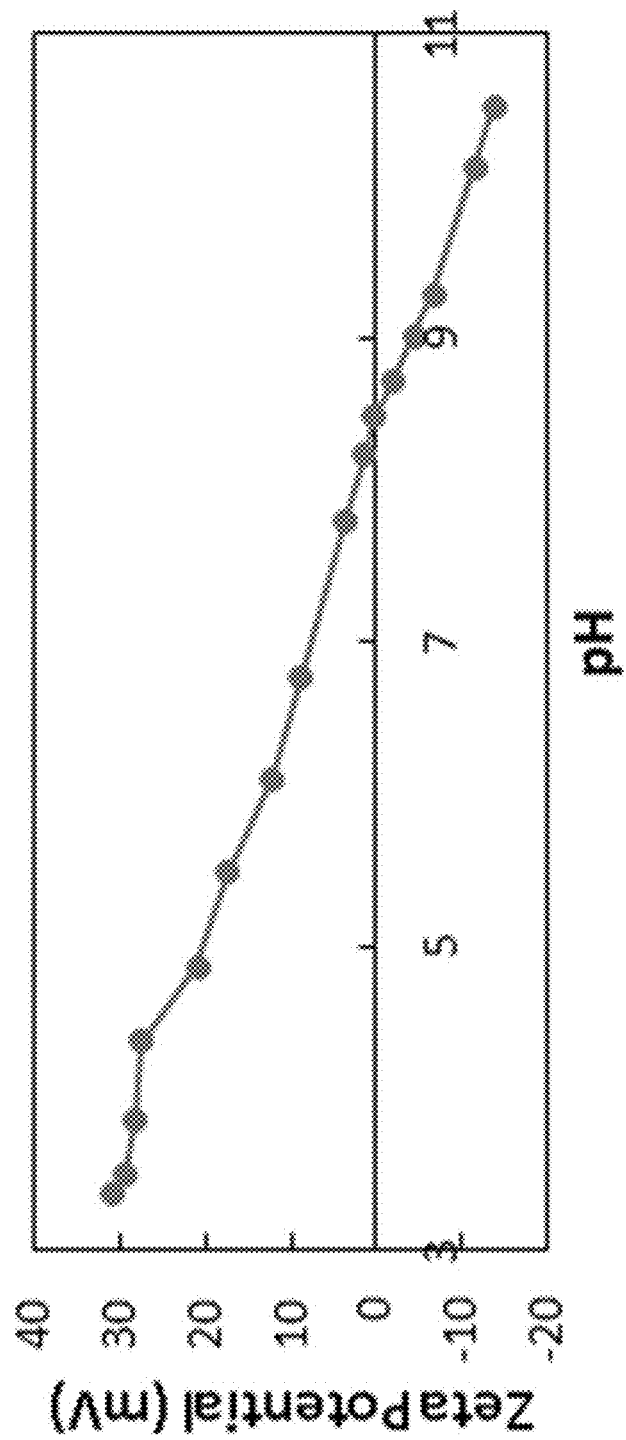
FIG. 2 is a graph of zeta potential vs. pH showing that $BaFe_{12}O_{19}$ hexaferrite nanoparticles disperse well in low pH aqueous solution, according to Example 1.
Figure 3:
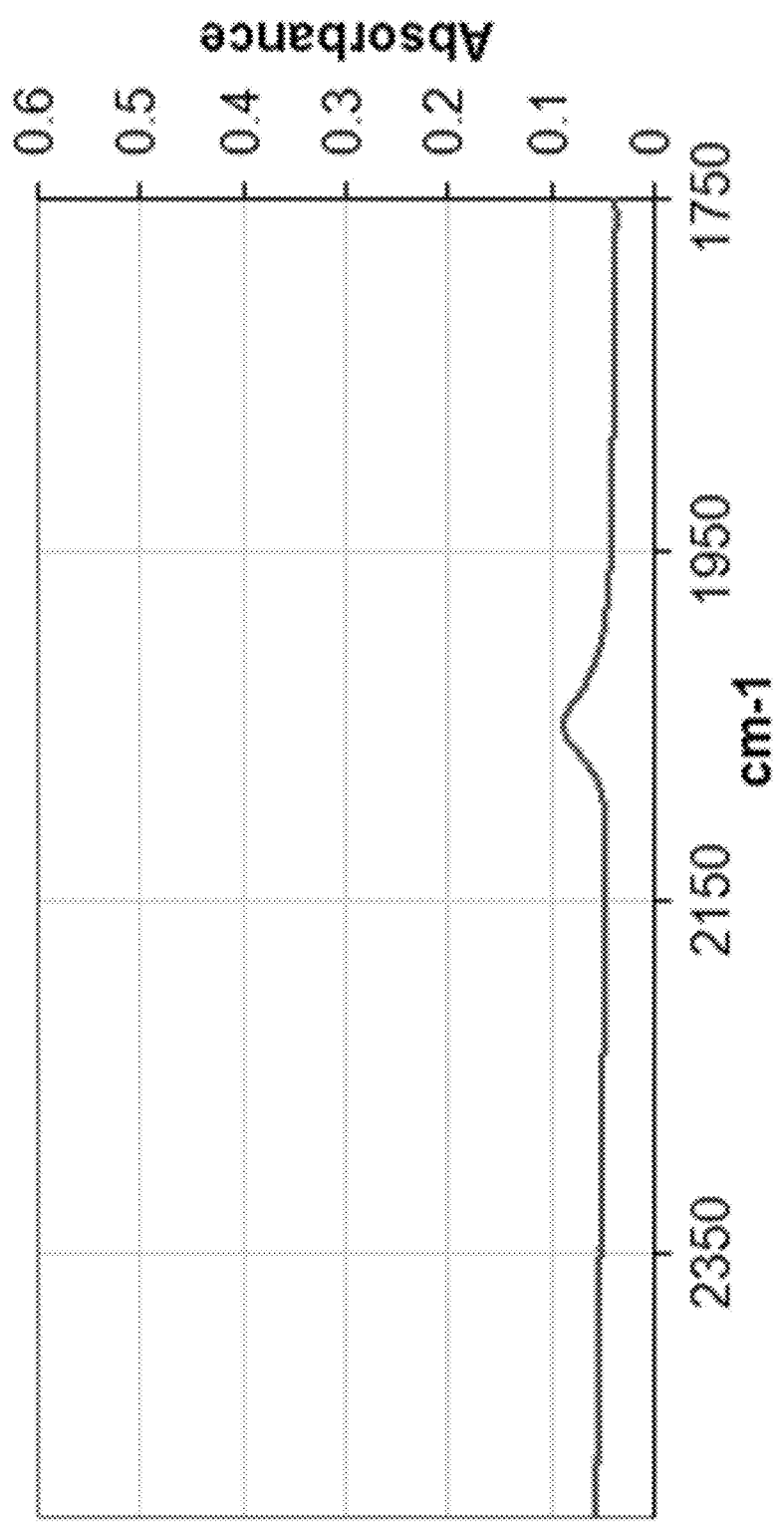
FIG. 3 is an infrared absorption spectrum of $BaFe_{12}O_{19}$ hexaferrite nanoparticles with thiocyanate ligands on the surface shown by the peak near 2000 $cm^-$, according to Example 1.
Figure 4:
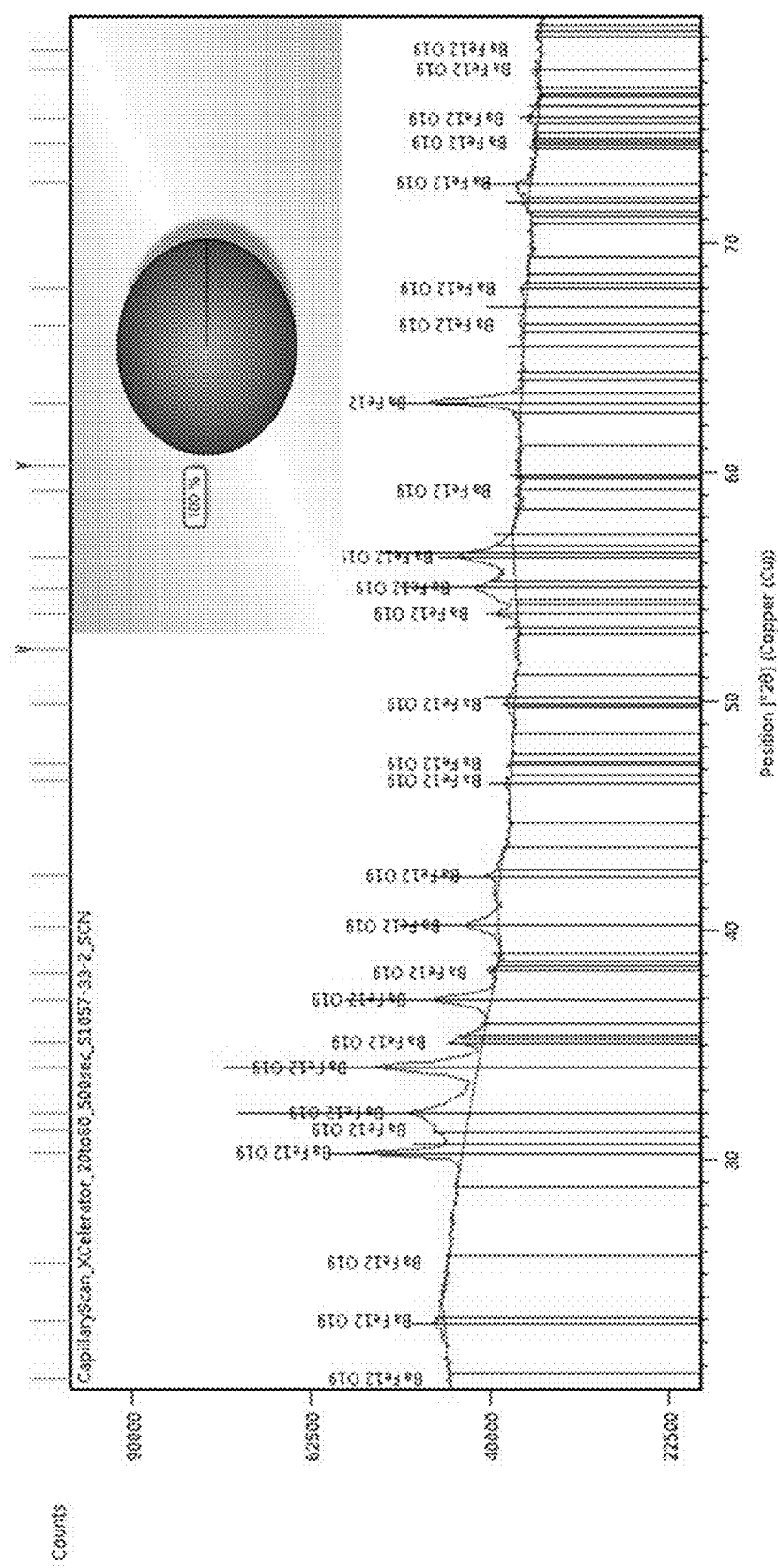
FIG. 4 is an XRD pattern confirming that 100 wt % $BaFe_{12}O_{19}$ hexaferrite phase is obtained in Example 1.

The produced $BaFe_{12}O_{19}$ nanoparticles disperse in water. Scanning electron microscopy (SEM), x-ray diffraction (XRD), zeta potential measurements, and infrared absorption spectroscopy are performed on these nanoparticles. FIG. 1 is a SEM image of these $BaFe_{12}O_{19}$ hexaferrite nanoparticles (platelets) synthesized at 270° C. for 10 min. FIG. 2 is a zeta potential vs. pH curve showing that these $BaFe_{12}O_{19}$ hexaferrite nanoparticles disperse well (zeta potential of about +30 mV) in low pH aqueous solution. FIG. 3 is an infrared absorption spectrum of these $BaFe_{12}O_{19}$ hexaferrite nanoparticles, showing an absorption peak at about 2000 cm-1 from the thiocyanate ligands on the hexaferrite nanoparticle surface. FIG. 4 is an XRD pattern that confirms that 100 wt % $BaFe_{12}O_{19}$ hexaferrite phase is obtained.

Example 2: Hydrothermal Synthesis of Barium Hexaferrite Platelets at 300° C. with Thiocyanate Ligands 26.1 mg barium nitrate and 202 mg iron nitrate nonahydrate are dissolved in 1 mL deoxygenated water via a vortex mixer, making a nitrate solution. In a separate container, 1.028 g sodium hydroxide and 18.3 mg ammonium thiocyanate are dissolved in 9 mL deoxygenated water with vigorous stirring. The sodium hydroxide solution is purged with nitrogen continuously while stirring for at least 10 min. The nitrate solution is added to the sodium hydroxide solution drop by drop while stirring. Finally, the mixture is transferred to a stainless steel tube vessel. The tube vessel is then placed inside a 300° C. preheated oven and removed after 30 min to produce $BaFe_{12}O_{19}$ nanoparticles, followed by quenching in tap water. The final solution is washed with 10 mM nitric acid followed by acetone several times. The $BaFe_{12}O_{19}$ hexaferrite nanoparticles are resuspended in DI water.

Figure 5:
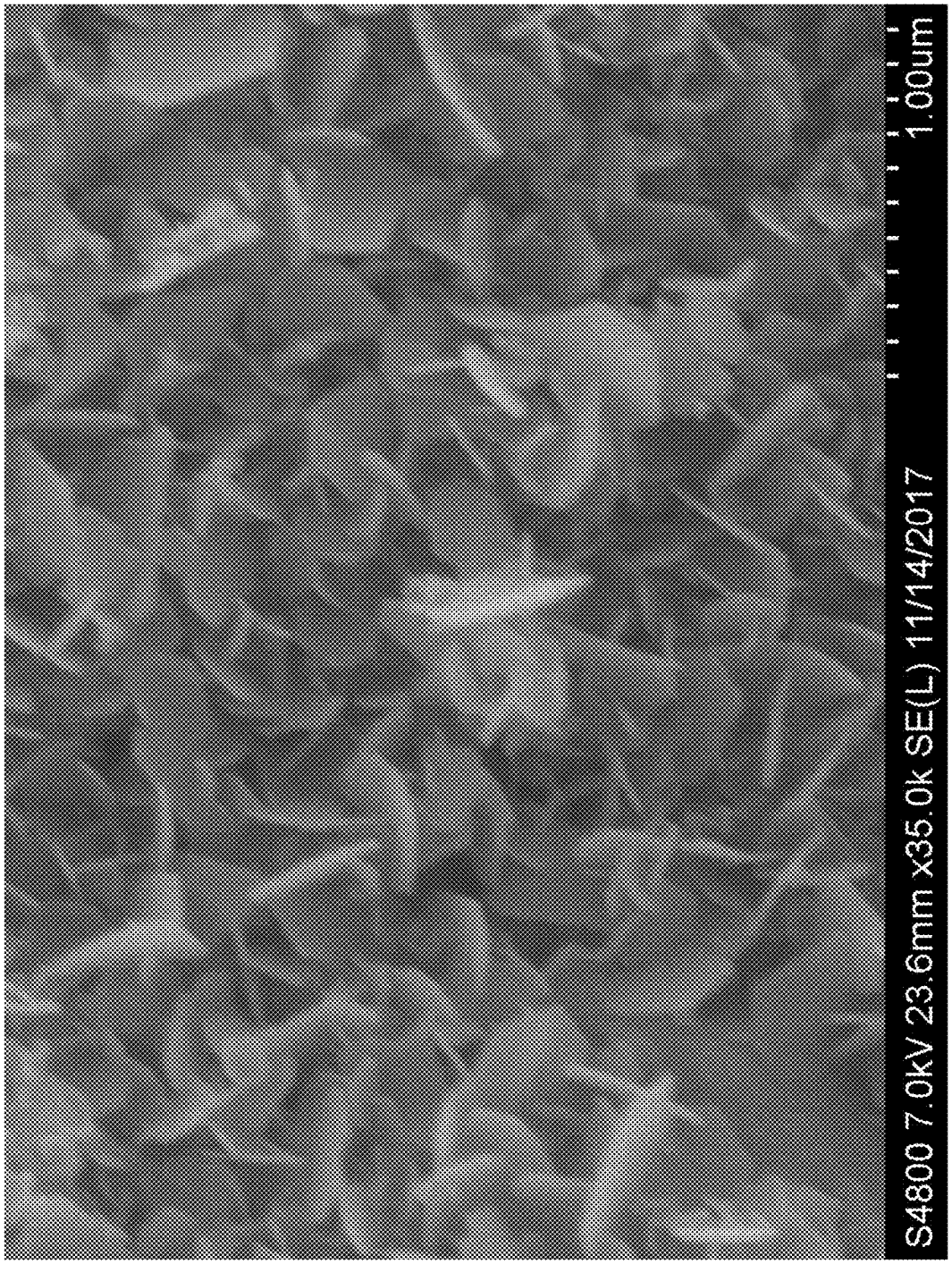
FIG. 5 is a SEM image of $BaFe_{12}O_{19}$ nanoparticles (platelets) synthesized at 300° C. for 30 min, according to Example 2.
Figure 6:
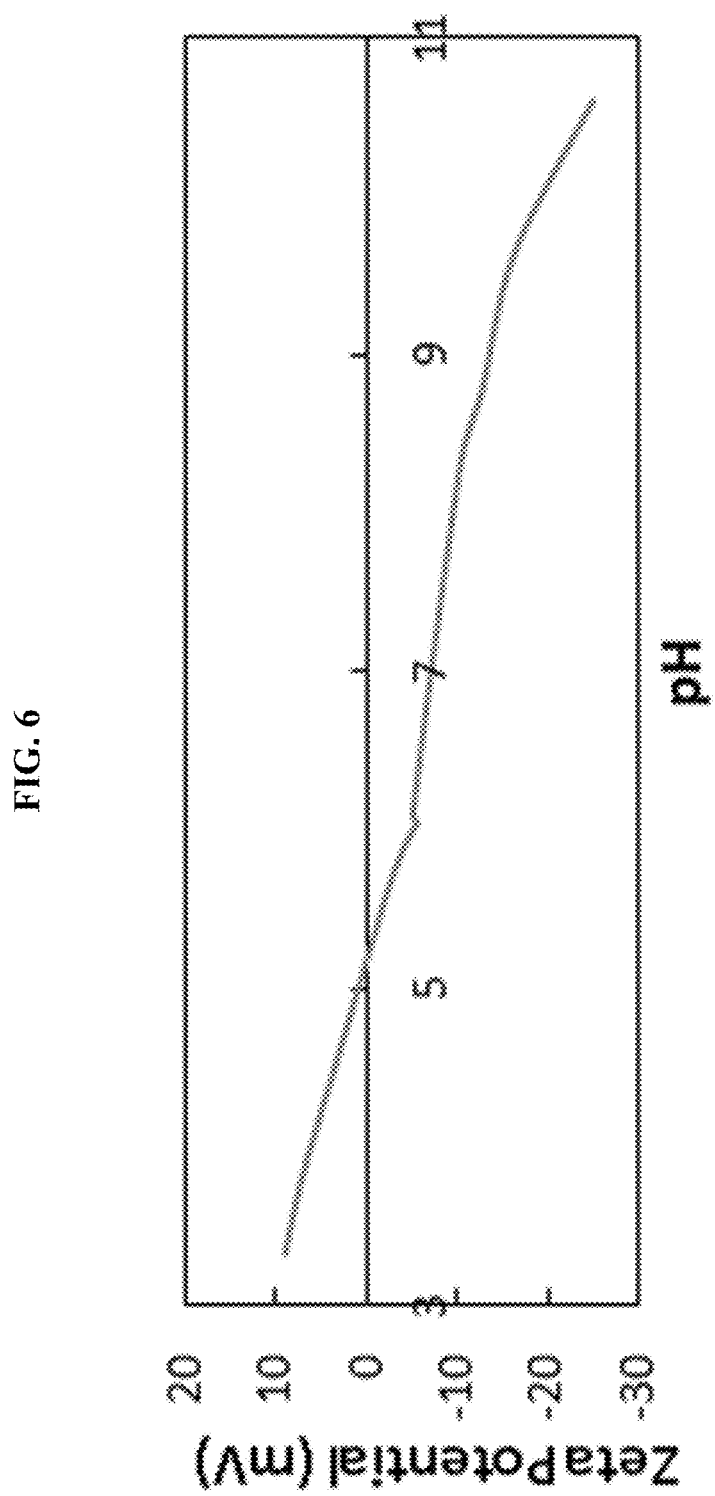
FIG. 6 is a graph of zeta potential vs. pH, showing that $BaFe_2O_{19}$ hexaferrite nanoparticles disperse well in high pH aqueous solution, according to Example 2.

These $BaFe_{12}O_{19}$ hexaferrite nanoparticles disperse in water. SEM and XRD are performed on these nanoparticles. FIG. 5 is a SEM image of these $BaFe_{12}O_{19}$ nanoparticles (platelets) synthesized at 300° C. for 30 min. FIG. 6 is a zeta potential vs. pH curve, showing that these nanoparticles disperse well in high pH aqueous solution with a zeta potential of about −25 mV at a pH of 10.6. XRD (not shown) confirms that 100 wt % $BaFe_{12}O_{19}$ hexaferrite phase is obtained.

Example 3: Hydrothermal Synthesis of Barium Hexaferrite Platelets at 300° C. with Ammonium Thiocyanate Ligands 26.1 mg barium nitrate and 202 mg iron nitrate nonahydrate are dissolved in 1 mL deoxygenated water via a vortex mixer, making a nitrate solution. In a separate container, 1.028 g sodium hydroxide and 18.3 mg ammonium thiocyanate are dissolved in 9 mL deoxygenated water with vigorous stirring. The sodium hydroxide solution is purged with nitrogen continuously while stirring for at least 10 min. The nitrate solution is added to the sodium hydroxide solution drop by drop while stirring. Finally, the mixture is transferred to a stainless steel tube vessel. The tube vessel is then placed inside a 300° C. preheated oven and removed after 90 min to produce $BaFe_{12}O_{19}$ nanoparticles, followed by quenching in tap water. The final solution is washed with 10 mM nitric acid followed by acetone several times. The $BaFe_{12}O_{19}$ hexaferrite nanoparticles are resuspended in DI water.

Figure 8:
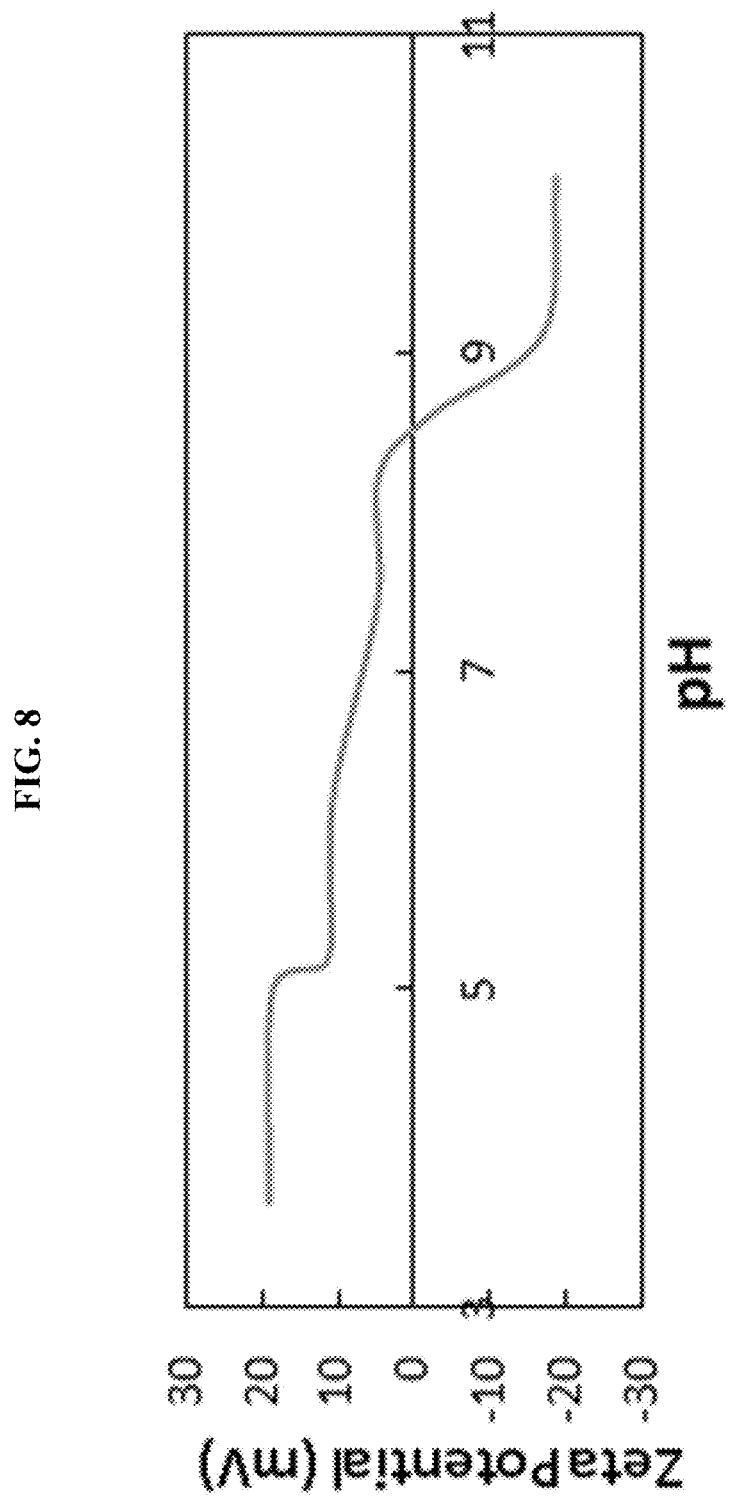
FIG. 8 is a zeta potential vs. pH curve, showing that $BaFe_{12}O_{19}$ hexaferrite nanoparticles disperse in pH<5 aqueous solution, and also disperse in pH>9 aqueous solution, according to Example 3.

These $BaFe_{12}O_{19}$ hexaferrite nanoparticles disperse in water. SEM and XRD are performed on these nanoparticles. FIG. 7 is a SEM image of these $BaFe_{12}O_{19}$ nanoparticles (platelets) synthesized at 300° C. for 90 min. FIG. 8 is a zeta potential vs. pH curve, showing that these $BaFe_{12}O_{19}$ hexaferrite nanoparticles disperse in pH<5 (zeta potential about +20 mV) aqueous solution, such as pH=3.6, and also disperse in pH>9 (zeta potential about −20 mV) aqueous solution. XRD (not shown) reveals that 66 wt % $BaFe_{12}O_{19}$ hexaferrite phase is obtained, along with 34 wt % $Fe_2O_3$.

Example 4: Hydrothermal Synthesis of Barium Hexaferrite Platelets at 270° C. with Citrate Ligands 26.1 mg barium nitrate and 202 mg iron nitrate nonahydrate are dissolved in 1 mL deoxygenated water via a vortex mixer, making a nitrate solution. In a separate container, 1.028 g sodium hydroxide and 46.2 mg citric acid are dissolved in 9 mL deoxygenated water with vigorous stirring. The sodium hydroxide solution is purged with nitrogen continuously while stirring for at least 10 min. The nitrate solution is added to the sodium hydroxide solution drop by drop while stirring. Finally, the mixture is transferred to a Teflon liner and sealed in a Parr vessel. The Parr vessel is then placed inside an oven, and the temperature profile is set to 270° C. with heating rate 3° C./min. The reaction vessel is held at 270° C. for 10 min to produce $BaFe_{12}O_{19}$ nanoparticles, and then cooled down to room temperature. The final solution is washed with 10 mM nitric acid followed by acetone several times. The $BaFe_{12}O_{19}$ hexaferrite nanoparticles are stored in DI water.

Figure 9:
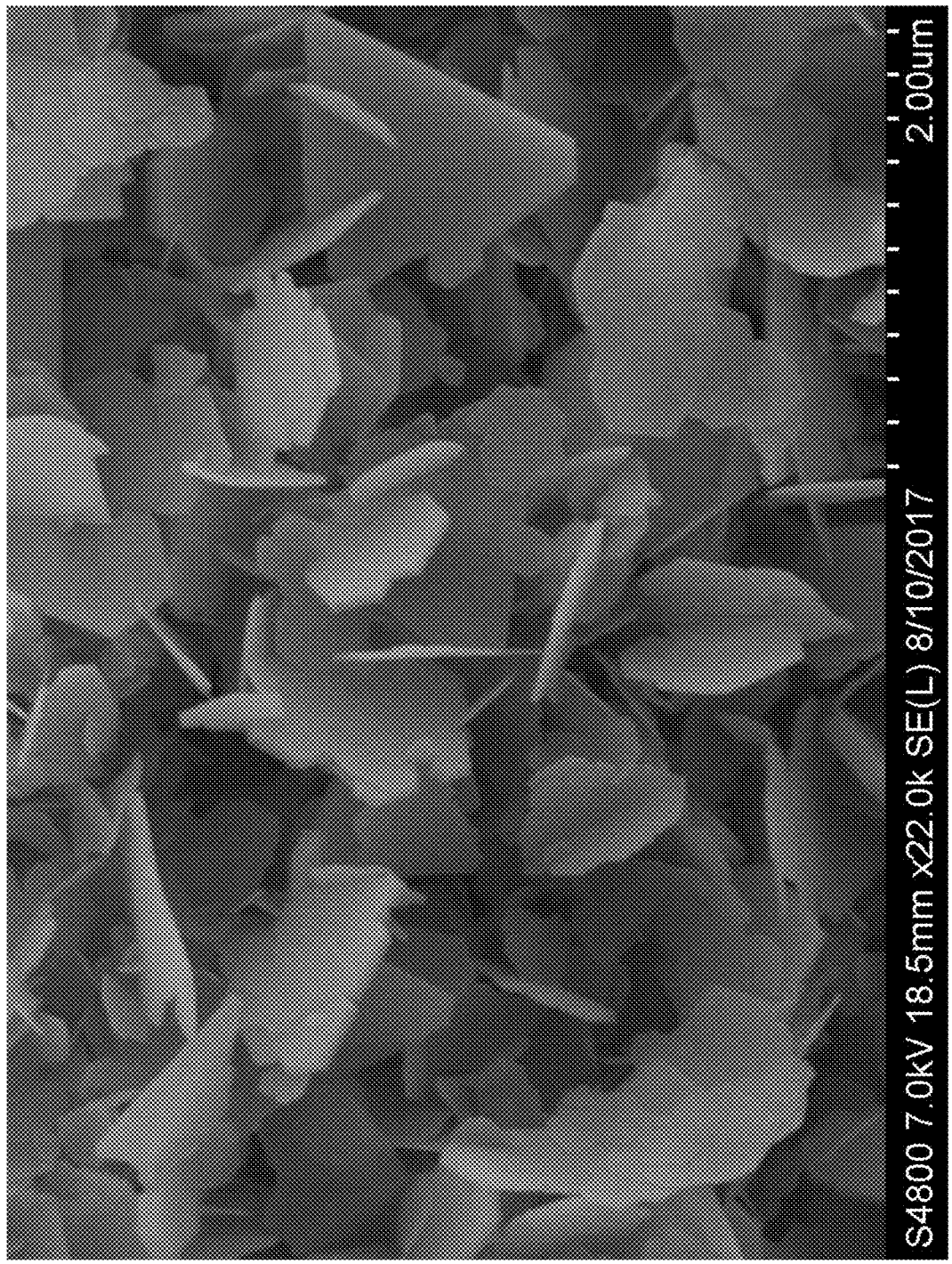
FIG. 9 is a SEM image of $BaFe_{12}O_{19}$ nanoparticles (platelets) synthesized at 270° C. for 10 min, according to Example 4.

These nanoparticles disperse in water. FIG. 9 is a SEM image of these $BaFe_{12}O_{19}$ nanoparticles (platelets) synthesized at 270° C. for 10 min. XRD (not shown) reveals that 89 wt % $BaFe_{12}O_{19}$ hexaferrite phase is obtained, along with 11 wt % $Fe_2O_3$.

Adding citric acid during the synthesis is not equivalent to treatment of the nanoparticles with citric acid following synthesis. See Primic et al., "Composite nanoplatelets combining soft-magnetic iron oxide with hard-magnetic barium hexaferrite", *Nanoscale* 2015, 7, 2688, which is hereby incorporated by reference, for results obtained by treating the nanoparticles with citric acid following synthesis of hexaferrite nanoparticles.

Example 5: Hydrothermal Synthesis of Barium Hexaferrite Platelets at 270° C. with Oleate Ligands 26.1 mg barium nitrate and 202 mg iron nitrate nonahydrate are dissolved in 1 mL deoxygenated water via a vortex mixer, making a nitrate solution. In a separate container, 1.028 g sodium hydroxide is dissolved in 9 mL deoxygenated water with vigorous stirring. 28.3 mg oleic acid is then added to the sodium hydroxide solution. The sodium hydroxide solution is purged with nitrogen continuously while stirring for at least 10 min. The nitrate solution is added to the sodium hydroxide solution drop by drop while stirring. Finally, the mixture is transferred to a Teflon liner and sealed in a Parr vessel. The Parr vessel is then placed inside an oven, and the temperature profile is set to 270° C. with heating rate 3° C./min. The reaction vessel is held at 270° C. for 10 min to produce $BaFe_{12}O_{19}$ nanoparticles, and then cooled down to room temperature. The final solution is washed with 10 mM nitric acid followed by acetone several times. The $BaFe_{12}O_{19}$ hexaferrite nanoparticles are stored in DI water.

Figure 10:
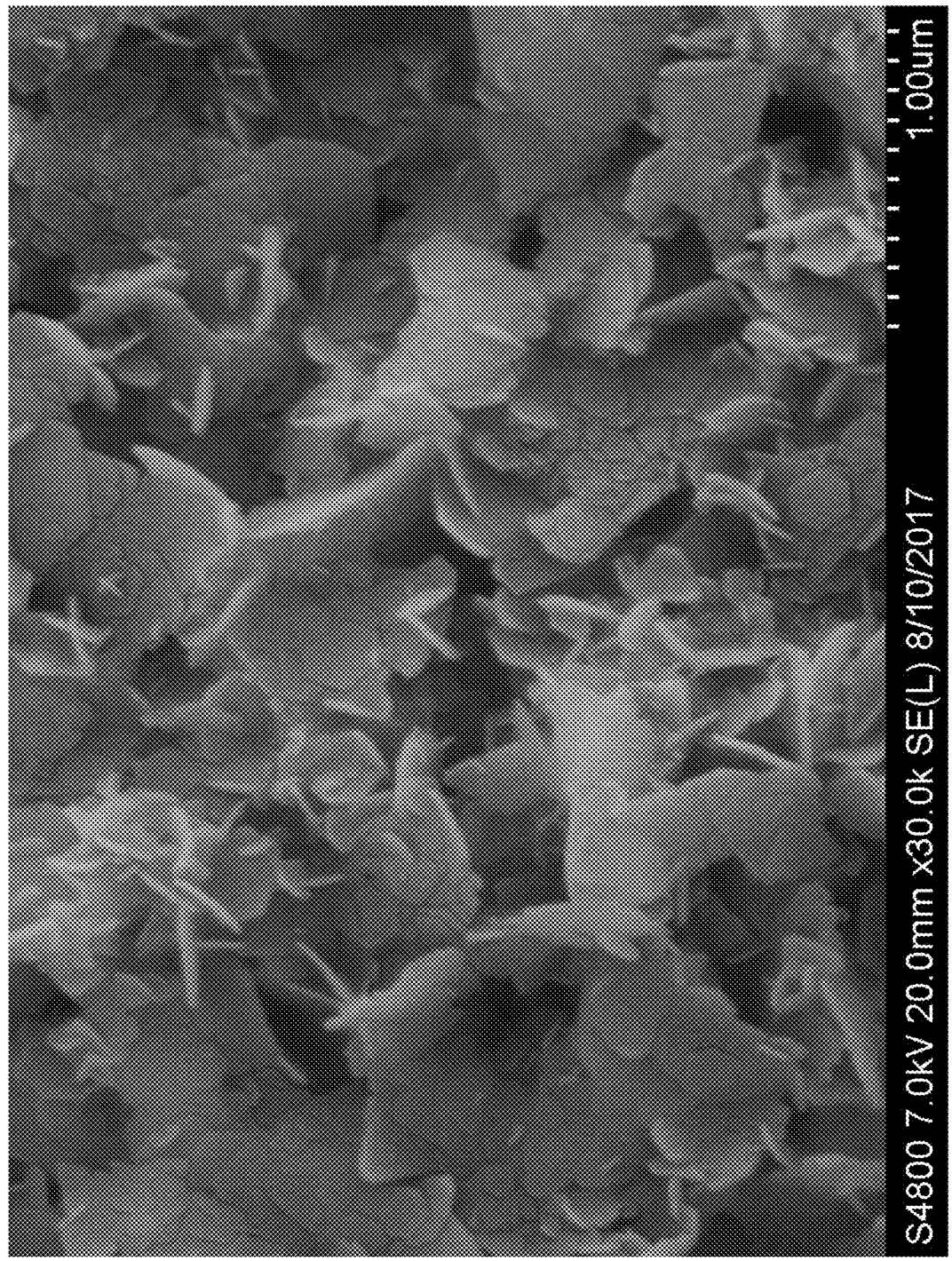
FIG. 10 is a SEM image of $BaFe_{12}O_{19}$ nanoparticles (polydisperse platelets) synthesized at 270° C. for 10 min, according to Example 5.

These nanoparticles do not disperse significantly in water. FIG. 10 is a SEM image of these $BaFe_2O_{19}$ nanoparticles (polydisperse platelets) synthesized at 270° C. for 10 min. The polydispersity of the nanoparticles is estimated from FIG. 10 to be greater than 30% standard deviation of platelet width. XRD (not shown) reveals that 77 wt % $BaFe_{12}O_{19}$ hexaferrite phase is obtained, along with 23 wt % $Fe_2O_3$.

Because the nanoparticles do not disperse significantly in water, the nanoparticles are polydisperse, and the hexaferrite content is less than 80 wt %, this Example 5 is a less-preferred example of the disclosure.

It is noted that the choice of ligand or salt dispersant affects the crystal phase purity of the nanoparticles. Examples 1 and 2 employ ammonium thiocyanate and form 100 wt % $BaFe_{12}O_{19}$, while Example 4 uses citric acid and forms 89% $BaFe_{12}O_{19}$, and Example 5 uses oleic acid and forms 77 wt % $BaFe_12019$.

Example 6: Hydrothermal Synthesis of Barium Hexaferrite Platelets at 270° C. with EDTA Ligands 26.1 mg barium nitrate and 202 mg iron nitrate nonahydrate are dissolved in 1 mL deoxygenated water via a vortex mixer, making a nitrate solution. In a separate container, 1.028 g sodium hydroxide is dissolved in 9 mL deoxygenated water with vigorous stirring. 70.1 mg EDTA is then added to the sodium hydroxide solution. The sodium hydroxide solution is purged with nitrogen continuously while stirring for at least 10 min. The nitrate solution is added to the sodium hydroxide solution drop by drop while stirring. Finally, the mixture is transferred to a Teflon liner and sealed in a Parr vessel. The Parr vessel is then placed inside an oven, and the temperature profile is set to 270° C. with heating rate 3° C./min. The reaction vessel is held at 270° C. for 10 min to produce $BaFe_{12}O_{19}$ nanoparticles, and then cooled down to room temperature. The final solution is washed with 10 mM nitric acid followed by acetone several times. The $BaFe_{12}O_{19}$ hexaferrite nanoparticles are stored in DI water. XRD (not shown) reveals 100% pure-phase $BaFe_{12}O_{19}$. Measurement of the widths of the particles in SEM images (not shown) gives an average width of about 700 nm and a standard deviation of about 170 nm. Thus, there is a 170/700=24% standard deviation of size distribution to the $BaFe_{12}O_{19}$ particles.

Comparative Example: Hydrothermal Synthesis of Barium Hexaferrite Platelets without any Ligands 26.1 mg barium nitrate and 202 mg iron nitrate nonahydrate are dissolved in 1 mL deoxygenated water via a vortex mixer, making a nitrate solution. In a separate container, 1.028 g sodium hydroxide is dissolved in 9 mL deoxygenated water with vigorous stirring. The sodium hydroxide solution is purged with nitrogen continuously while stirring for at least 10 min. The nitrate solution is then added to the sodium hydroxide solution drop by drop while stirring. Finally, the mixture is transferred to a Teflon liner and sealed in a Parr vessel. The Parr vessel is then placed inside an oven, and the temperature profile is set to 150° C. with heating rate 3° C./min. The reaction vessel is held at 150° C. for 10 min to produce $BaFe_{12}O_{19}$ nanoparticles, and then quenched in tap water. The final solution is washed with 10 mM nitric acid followed by acetone several times. The $BaFe_{12}O_{19}$ hexaferrite nanoparticles are stored in DI water.

These $BaFe_{12}O_{19}$ hexaferrite nanoparticles (no ligands) do not disperse in water at any pH.

The structures provided herein are useful in a wide variety of applications, including but not limited to magnetic devices, drive motors, windshield wiper motors, starter motors, commercial aircraft pumps and actuators, magnets, controlled wetting and anti-reflective coatings, optical scattering surfaces, diffractive coatings, and cameras. Integrated magnetic components can be provided, such as micron-thick magnetic thin films from nanoparticles, which are difficult to achieve with top-down fabrication.

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. A method of making water-dispersed hexaferrite nanoparticles, said method comprising:
   (a) providing a first salt containing iron and a second salt containing barium and/or strontium, wherein at least one of said first salt or said second salt further contains oxygen;
   (b) providing a third salt containing an anion or cation that is capable of forming a ligand with said hexaferrite nanoparticles;
   (c) combining said first salt, said second salt, said third salt, and water to form a reaction mixture;
   (d) heating said reaction mixture to a reaction temperature selected from about 100° C. to about 400° C. for a reaction time selected from about 1 minute to about 10 hours, wherein hexaferrite nanoparticles are formed and are dissolved and/or suspended in said reaction mixture, and wherein said anion or said cation in said third salt forms a ligand on the surface of said hexaferrite nanoparticles; and
   (e) obtaining water-dispersed hexaferrite nanoparticles with an average zeta potential of at least ±20 mV, wherein said water-dispersed hexaferrite nanoparticles are characterized by an average hexaferrite content of at least 85 wt %.

2. The method of claim 1, wherein said reaction temperature is selected from about 200° C. to about 300° C.

3. The method of claim 1, wherein said reaction mixture is contained in a sealed reaction vessel.

4. The method of claim 1, said method further comprising cooling said reaction mixture following step (d).

5. The method of claim 1, said method further comprising washing said hexaferrite nanoparticles in an aqueous solution following step (d).

6. The method of claim 1, said method further comprising adding water to said hexaferrite nanoparticles between step (d) and step (e).

7. The method of claim 1, wherein in step (e), said water-dispersed hexaferrite nanoparticles have an average zeta potential of at least ±30 mV.

8. The method of claim 1, wherein said water-dispersed hexaferrite nanoparticles are characterized by an average hexaferrite content of at least 95 wt %.

9. The method of claim 1, wherein said hexaferrite nanoparticles contain $BaFe_2O_{19}$, $SrFe_{12}O_{19}$, or a mixture thereof.

10. The method of claim 1, wherein said hexaferrite nanoparticles are characterized by an average percent of crystalline hexaferrite of at least 80%.

11. The method of claim 1, wherein said hexaferrite nanoparticles are characterized by an average percent of crystalline hexaferrite of at least 90%.

12. The method of claim 1, wherein said ligand is selected from the group consisting of thiocyanate, ethylenediaminetetraacetate, citrate, and combinations thereof.

13. The method of claim 1, wherein said ligand is not incorporated into a crystal structure of said hexaferrite nanoparticles.

14. The method of claim 1, said method further comprising exchanging said ligand with a second ligand, thereby modifying said hexaferrite nanoparticles so that said hexaferrite nanoparticles are dispersible in a solvent other than water.

15. The method of claim 1, said method further comprising treating said hexaferrite nanoparticles with an alkoxysilane.

16. The method of claim 1, wherein said hexaferrite nanoparticles are characterized by an average particle thickness from about 1 nanometer to about 500 nanometers.

17. The method of claim 1, wherein said hexaferrite nanoparticles are characterized by an average particle width from about 10 nanometers to about 1000 nanometers.

18. The method of claim 1, wherein said hexaferrite nanoparticles are characterized by a polydispersity of less than 30% standard deviation of average nanoparticle width.

19. The method of claim 1, wherein said hexaferrite nanoparticles are characterized by a polydispersity of less than 30% standard deviation of average nanoparticle thickness.

20. The method of claim 1, said method further comprising drying and aligning said hexaferrite nanoparticles to generate dried and aligned hexaferrite nanoparticles, wherein said dried and aligned hexaferrite nanoparticles are characterized by a magnetic remanence to saturation ratio greater than 0.6.

21. The method of claim 1, said method further comprising assembling a plurality of said water-dispersed hexaferrite nanoparticles into a magnetic component.

22. The method of claim 21, wherein said magnetic component is a self-biased hexaferrite film.

23. The method of claim 21, wherein said magnetic component is disposed on a substrate.

24. The method of claim 21, wherein said substrate is a semiconductor substrate.

* * * * *